US009507867B2

(12) United States Patent
Johns et al.

(10) Patent No.: US 9,507,867 B2
(45) Date of Patent: Nov. 29, 2016

(54) DISCOVERY ENGINE

(71) Applicant: Enlyton, Inc., Austin, TX (US)

(72) Inventors: Mark Ellingham Johns, Gaithersburg, MD (US); Chris McKinzie, Lakeway, TX (US)

(73) Assignee: Enlyton Inc.

( * ) Notice: Subject to any disclaimer, the term of this patent is extended or adjusted under 35 U.S.C. 154(b) by 0 days.

(21) Appl. No.: 14/199,985

(22) Filed: Mar. 6, 2014

(65) Prior Publication Data

US 2014/0236941 A1    Aug. 21, 2014

Related U.S. Application Data

(63) Continuation of application No. 13/441,123, filed on Apr. 6, 2012, now abandoned.

(60) Provisional application No. 61/850,987, filed on Feb. 27, 2013.

(51) Int. Cl.
*G06F 17/30* (2006.01)

(52) U.S. Cl.
CPC ... *G06F 17/30873* (2013.01); *G06F 17/30864* (2013.01); *G06F 17/30616* (2013.01)

(58) Field of Classification Search
CPC .............. G06F 17/30864; G06F 17/30616
See application file for complete search history.

(56) References Cited

U.S. PATENT DOCUMENTS

| 7,587,381 | B1* | 9/2009 | Remy ............... G06F 17/30616 |
| 8,612,208 | B2* | 12/2013 | Cooper et al. .................... 704/9 |
| 2005/0262062 | A1* | 11/2005 | Xia .................................. 707/3 |
| 2007/0136256 | A1* | 6/2007 | Kapur ................ G06F 17/3069 |
| 2009/0070325 | A1* | 3/2009 | Gabriel ............. G06F 17/30705 |
| 2010/0138452 | A1* | 6/2010 | Henkin et al. ................ 707/803 |
| 2012/0254333 | A1* | 10/2012 | Chandramouli ........ G06F 17/27 709/206 |

* cited by examiner

*Primary Examiner* — Rehana Perveen
*Assistant Examiner* — Raheem Hoffler
(74) *Attorney, Agent, or Firm* — The Law Firm of H. Dale Langley, Jr., P.C.

(57) ABSTRACT

A method that is relatively inexpensive to implement and that permits a user to conduct searches of electronically stored documents using an entire document, multiple documents or portions of a document as the search criteria and to collect, store and to share the relevant documents from the search.

27 Claims, 12 Drawing Sheets

| | | |
|---|---|---|
| 102 — | Location | http://en.wikipedia.org/wiki/Google_Toolbar |
| 103 — | Comments | |
| 104 — | Title | Google Toolbar – Wikipedia, the free encyclopedia |

100

| | | |
|---|---|---|
| 105 — | Location | http://en.wikipedia.org/wiki/AOL_Toolbar |
| 106 — | Comments | |
| 107 — | Title | AOL Toolbar – Wikipedia, the free encyclopedia |

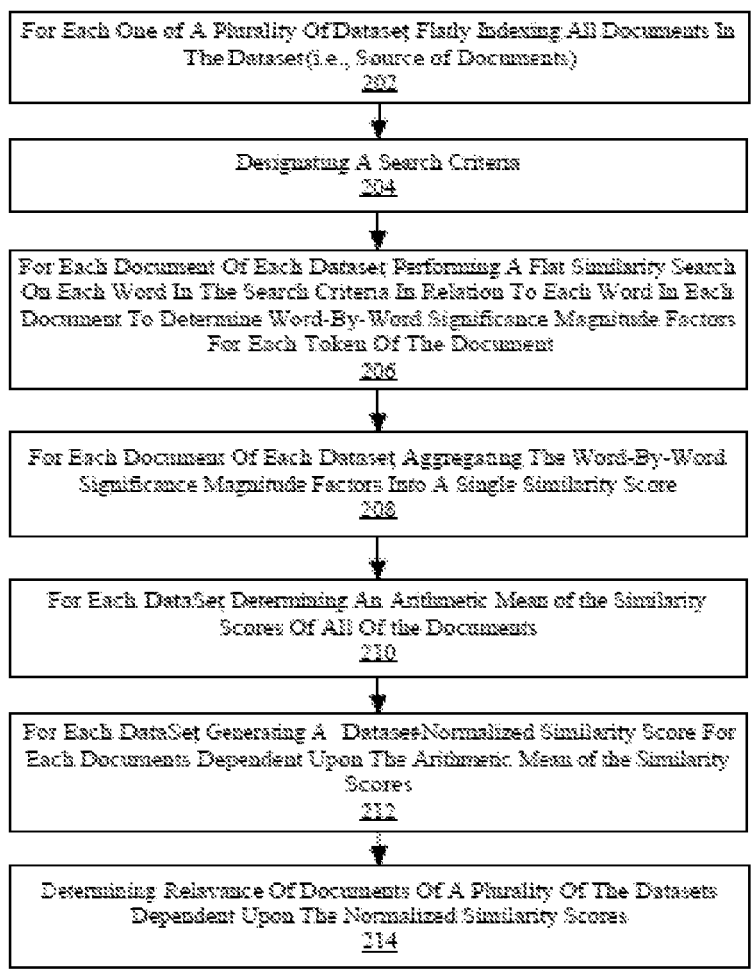

- For Each One of A Plurality Of Dataset, Firstly Indexing All Documents In The Dataset (i.e., Source of Documents) 202
- Designating A Search Criteria 204
- For Each Document Of Each Dataset Performing A Flat Similarity Search On Each Word In The Search Criteria In Relation To Each Word In Each Document To Determine Word-By-Word Significance Magnitude Factors For Each Token Of The Document 206
- For Each Document Of Each Dataset Aggregating The Word-By-Word Significance Magnitude Factors Into A Single Similarity Score 208
- For Each DataSet Determining An Arithmetic Mean of the Similarity Scores Of All Of the Documents 210
- For Each DataSet Generating A Dataset-Normalized Similarity Score For Each Documents Dependent Upon The Arithmetic Mean of the Similarity Scores 212
- Determining Relevance Of Documents Of A Plurality Of The Datasets Dependent Upon The Normalized Similarity Scores 214

DISCOVERY ENGINE

CROSS REFERENCE TO RELATED APPLICATIONS

This non-provisional patent application is a continuation-in-part that claims priority from the co-pending U.S. non-provisional patent application having Ser. No. 13/441,123 filed Apr. 6, 2012 entitled "Discovery Engine", having a common applicant herewith, and being incorporated herein in its entirety by reference.

This non-provisional patent application claims priority from the co-pending U.S. provisional patent application having Ser. No. 61/850,987 filed Feb. 27, 2013 entitled "Discovery Engine", having a common applicant herewith, and being incorporated herein in its entirety by reference.

FIELD OF THE DISCLOSURE

The disclosures made herein relate generally to the search engine and discovery engine industry. Embodiments of the present invention disclosed herein are in the general classification of a device and methodology for conducting a search of electronically stored documents and collecting, storing and sharing the related documents found through the search.

BACKGROUND

This section introduces aspects that may be helpful in facilitating a better understanding of embodiments of the present invention. Accordingly, the statements of this section are to be read in this light and are not to be understood as admissions about what is in the prior art or what is not in the prior art.

Most individuals are familiar with manual searching for books, magazines or documents in a library or similar setting. Searching, in its most rudimentary form, often simply involves a researcher seeking a specific book written by a particular author by perusing the library stacks by category type and utilizing alphabetical order or some other organizational scheme to locate the specific book.

Searching for documents stored electronically often involves searching within a specific database via names or key words/search terms. When a researcher must independently search each database, he will only uncover documents stored in the selected database that relate to the search terms, and he will not uncover any related documents stored in other databases. This creates an organizational problem in that different researchers may search different databases attempting to find the same type of documents. In other words, two different researchers may think that a given document they are searching for should be contained in two different databases due to their own notions of the proper categorization of the searched for document. As a result, one or both researchers may not discover the document that they are searching for due to their failure to classify the document in the same manner as the creator of the database and their failure to search the database deemed appropriate by the database creator.

With the advent of the Internet, millions of documents are available through Internet search engines. An electronic document is a cohesive body of text that is electronically accessible (e.g. a patent document, a news article, a legal case, a medical journal article or a webpage). Often, a group of documents are contained within a single source, dataset, collection or database. Most individuals are familiar with the process of searching for relevant documents within a document collection via keywords and search terms. A researcher types the key words/search terms into the search engine to locate related documents and then sifts through the document results to determine which documents are most relevant.

If the researcher is satisfied with the results he obtains via the key word search, he can print or save the documents and complete the search. However, often the researcher is not satisfied with the initial results and the query (i.e. key words or search terms) must be modified to obtain potentially better results. After a number of searches are performed, the researcher often collects and organizes the results by printing the documents or saving the documents into a folder. The problem with this searching methodology is twofold. First, the results of the search are dependent on the researcher's selection of key words. The researcher may not select the best key words or may not be able to obtain the best results by simply using a few words (i.e., search terms) and may obtain no results by using too many terms. Second, the document results saved or printed are not "living" documents in that they represent how the document appeared when the document was saved or printed. They are not dynamic and capable of being updated and then viewed at a later date without further researcher involvement. The document results are also a snapshot of the search conducted at a given point in time and any documents added to the dataset after the search will not be included in the search results.

Keyword searching is still quite analogous to manually investigating a collection of printed documents. Software essentially just helps to perform that job more efficiently. The advent of the search engine was a cornerstone in the evolution of information research, but a search engine simply finds documents that contain some specific words.

Advanced search engines such as Google are forgiving in the sense that they can yield results that do not literally match on the keywords and allow the researcher to utilize natural language. Search engines, such as Google, utilize a "Page Rank" that may skew results from any given search. "Page Rank" involves a link analysis algorithm that assigns a value to each element of a set of documents to determine a document's relative importance within the set of documents. The value assigned to a document/webpage on the World Wide Web is defined recursively and is calculated based on the number and "Page Rank" of all webpages that link to the document with the theory being that a document linked to by many webpages with high "Page Ranks" is also worthy of a high "Page Rank."

Semantics also play a role in natural language queries in which "unimportant" words such as "the" and "it" are discarded while the "important" words and synonyms to those "important" words are actually searched which may ultimately create a huge index that still needs to be manually inspected by the researcher.

Other database search engines (e.g. search engines for Wikipedia and the United States Patent and Trademark Office) utilize the familiar "Boolean keyword search" that is very literal and has its own distinct value and applicability. If a researcher types in too many keywords, no matches appear. If a researcher types in too few keywords, there are too many and highly varying results. If a researcher is unsatisfied with the results, he must rework the query by adding some complex operators (e.g. some combination of "AND", "OR", "NOT", and/or parentheses).

If a researcher is unfamiliar with the nuances of the Boolean keyword search system, he may not properly utilize the Boolean operators and may not structure the query in the proper manner to obtain the most desirable results. Moreover, a Boolean search is traditionally unforgiving in that the search terms entered are either present or they are not present in the selected range (e.g. in the entire document or in the same sentence as one another).

Key word searching also may be difficult to perform in certain situations because of the different meaning of given words (e.g. China and china), causing a large number of varying search results that need to be perused by a researcher.

Traditional search solutions do not allow for electronic searching for documents utilizing an entire document or documents as the search criteria or utilizing portions of a document supplemented with key words entered by a researcher as the search criteria. For example, if one were to copy an entire document and stick it into Google, Bing or Yahoo searches, one would get an error message because these search engines are not designed to search entire documents. There are a few search engines that do semantic searches of entire documents such as Text Wise. However, these prior art full document semantic search engines are sub optimum because they utilize logic based systems that require things such as proximity searches for words (e.g. is the word "horse" within two words of the word "shoe"), Boolean logic (e.g. AND, OR, AND NOT) and attempts to understand the meaning of words by associating the words with other words using logic (e.g. the word "china" may be related to kitchenware if the word "porcelain" or "plate" is also used in the same document). This type of prior art semantic search using logic, Boolean logic and proximity is computationally difficult and it increases both the time and money required to perform searches and to index groups of documents to be searched.

Other solutions also do not permit collection, storage and sharing of the documents found during this type of searching in a portable and dynamic manner.

The prior art searching technology simply allows a researcher to enter some keywords for searching that may yield a set of documents that at least come close to the type of documents sought. Upon reviewing these documents, if a researcher discovers some words in a related document that help him develop his search criteria, the prior art solutions require him to enter those key words from that related document as search terms to try to locate additional relevant documents. The context of the language preceding and following those key words from the related document is lost when a new key word search is performed using this traditional searching technique. The prior art does not allow the researcher to leverage the entirety of that particular related document as the criteria for the next search.

In many document collections, the highest quality search criterion is actually the entire text of one of the documents in the database. A real document in the collection (or a new one that the researcher types in full) contains much more useful information than what a researcher typically types as keywords. The natural language of the document and all of its inherent properties tend to shine through, if analyzed with appropriate algorithms. When the text of an entire document or large portions of text thereof are used as the search criteria, the set of related documents returned are most similar to or related to the original document or portions thereof. In "complexity theory" this phenomenon is known as "emergence." Emergence is the key to a natural stepping-stone in the evolution of information research from a "search engine" to a "discovery engine."

A researcher conducting a document search, such as a patent search, could leverage a "discovery engine" as opposed to a "search engine" to obtain superior results. In this type of search, the researcher already has a full description of the patent/document. The description can be submitted as the search criteria and the top related documents can be returned. Some of the results may look very relevant and the researcher can hold/identify these documents to enable him to return to them later. The researcher also can identify others to ignore so they do not show up as results again. If one of the documents discovered looks extremely relevant, the researcher can perform a further search using that entire relevant document as the search criteria to view the top related documents to that relevant document. The search criteria are effectively changing each time a search is performed without having to rework a query manually each time based on search results.

Hence, there is a need for a device and methodology that efficiently, reliably and affordably permit a user to utilize the text of an entire document as the search criteria and/or to utilize an entire document along with supplemental text supplied by a researcher and/or multiple documents or subsections of documents as the search criteria and/or any combination of these potential search criteria. There is also a need for a device and methodology that permit a user to collect, store and share the collected/related documents from a search with other users and to further permit any individual to conduct an updated search for any newly added documents in a dataset based on the same search criteria.

SUMMARY OF THE DISCLOSURE

A device configured in accordance with a preferred embodiment of the present invention includes a memory containing a set of instructions and a processor for processing the set of instructions. The set of instructions include instructions for selecting at least one category of sources (either automatically or through user selection); selecting at least one source (i.e. a collection of documents) within at least one category of sources (either automatically or through user selection); utilizing search terms to search the at least one source (assuming one does not already have a document already usable as the search criteria); returning related documents from the at least one source based on the search terms; collecting any of the related documents into a collection; permitting at least one related document returned to be selected for a further search utilizing the at least one related document as the search criteria in a selected source to return additional related documents (assuming one does not already have a document already usable as the search criteria); and exporting the collection of related documents by creating a Uniform Resource Locator (URL) with all of the collected related documents stored at a location referenced in the URL.

In preferred embodiments of the present invention, a set of instructions may also include instructions for utilizing a document such as a webpage to automatically conduct a search of designated sources for documents related to the document based on the content of the document and instructions for displaying the related documents found in the search in a collection and storing the collection under a single URL that can be utilized to display the collection.

In one embodiment of the present invention, a system comprises a memory containing a set of instructions and a processor for processing the set of instructions. The instructions cause the processor to perform a method comprising a plurality of operations. An operation is performed for receiving a current instance of search criteria, followed by an operation being performed for determining tokens in the current instance of the search criteria. For each document of at least one dataset, an operation is performed for determining each token that has at least one occurrence thereof within the current instance of the search criteria and within the document. For each document of the at least one dataset, an operation is performed for generating a similarity score indicating a degree of relevance of contents of the document to the current instance of the search criteria. Generating the similarity score includes characterizing similarity based on a number of times each token present in both the document and the current instance of the search criteria and based on uniqueness of each token with respect to each other token.

In another embodiment of the present invention, a non-transitory computer-readable medium has tangibly embodied thereon and accessible therefrom processor-executable instructions that, when executed by at least one data processing device of at least one computer, causes said at least one data processing device to perform a method comprising a plurality of operations. An operation is performed for receiving a current instance of search criteria, followed by an operation being performed for determining tokens in the current instance of the search criteria. For each document of at least one dataset, an operation is performed for determining each token that has at least one occurrence thereof within the current instance of the search criteria and within the document. For each document of the at least one dataset, an operation is performed for generating a similarity score indicating a degree of relevance of contents of the document to the current instance of the search criteria. Generating the similarity score includes characterizing similarity based on a number of times each token present in both the document and the current instance of the search criteria and based on uniqueness of each token with respect to each other token.

In another embodiment of the present invention, a non-transitory computer-readable medium has tangibly embodied thereon and accessible therefrom processor-executable instructions that, when executed by at least one data processing device of at least one computer, causes said at least one data processing device to perform a method comprising a plurality of operations. An operation is performed for receiving a current instance of search criteria. The current instance of the search criteria includes a uniform resource locator (URL). An operation is performed for determining tokens in the current instance of the search criteria. For each document of at least one source of documents, an operation is performed for performing a first frequency count for characterizing a number of times that each one of the tokens occurs within the text used as the current instance of the search criteria in comparison to each one of the documents in the at least one source of documents. For each one of the tokens, an operation is performed for performing a second frequency count for characterizing an aggregate number of times that a particular one of the tokens occurs within all of the documents in the at least one source of documents. For each document in the at least one source of documents, an operation is performed for generating a similarity score between the text used as the current instance of the search criteria and a particular one of the documents, wherein the similarity score is a function of the first frequency count for the particular one of the documents and the second frequency count for each token in the particular one of the documents.

In accordance with embodiments of the present invention, a preferred methodology for searching a collection of electronically stored documents when one does not already have a document available to serve as the search criteria involves: (1) selecting at least one category of sources; (2) selecting at least one source (i.e. a collection of documents) within at least one category of sources; (3) utilizing search terms to search the at least one source; (4) returning related documents from the at least one source based on the search terms; (5) collecting any of the related documents into a collection; (6) permitting at least one related document returned to be selected for a further search utilizing the at least one related document as the search criteria in a selected source to return additional related documents; and (7) creating a URL with all of the collected related documents stored at a location referenced in the URL. In at least one embodiment of the present invention, the at least one related document selected as the search criteria is the text from a URL.

The step of collecting any of the related documents into a collection may involve identifying the related documents to be collected from each source. The step of collecting documents may be performed to collect additional related documents after any search.

Some embodiments of the present invention may further involve sharing the relevant documents by sending the URL to select other users via any electronic method, including social networking websites and electronic mail services.

Some embodiments of the present invention may involve utilizing a document such as a webpage to automatically conduct a search of designated sources for documents related to the document based on the contents of the document and displaying the related documents found in the search in a collection and storing the collection under a single URL that can be utilized to display the collection.

Some embodiments of the present invention may provide a method that is relatively inexpensive to implement and that permits a user to conduct searches of electronically stored documents using an entire document, multiple documents or portions of a document as the search criteria and to collect, store and to share the relevant documents from the search.

Some embodiments of the present invention may provide a device and method that are not operationally complex that permit a user to efficiently and effectively conduct searches of electronically stored documents using an entire document (which may or may not be the text of a URL itself), multiple documents or portions of a document as the search criteria and to collect, store and share the relevant documents from the search.

Some embodiments of the present invention may provide better search results than traditional Boolean or natural language searches utilizing only search terms input by a user by utilizing an entire document, documents, portions of documents or portions of documents supplemented with user input search terms.

Some embodiments of the present invention may provide more conveniently collected, stored and shared documents and document collections.

Some embodiments of the present invention may provide more dynamic search results that can be constantly updated without user involvement due to the nature of the searching and storage of the search results.

Some embodiments of the present invention may provide searching technology that does not require the use of an extreme amount of computer resources because the indexing of documents and the searching of documents in accordance with embodiments of the present invention is done in a manner which does not involved proximity searching, Boolean logic and/or other types of logic searching (e.g. trying to understand the meaning of words by looking for associations with other words). In the context of the disclosures made herein, indexing refers to a mechanism to collect and store information that is used in the process of information retrieval.

Some embodiments of the present invention may provide a computing process that indexes documents in the electronically stored documents (i.e. dataset) by counting words/tokens in each document in the stored documents; determining a numeric value that measures the magnitude of significance for each unique word/token in the dataset as a whole (i.e. common token/words in the dataset as a whole are less significant); using a numeric representation of the frequency of unique words/tokens in the document being used as the search criteria and multiplying a frequency of each unique word/token in the search document by the numeric value of its significance magnitude (i.e., the numeric value representing its magnitude of significance) so that each unique word/token in the search document has a numeric value representing the product of both its frequency of use factor (which may be a logarithmic derivate of the raw number) and its significance factor. After this numeric significance/frequency product is calculated for each unique word/token in the search criteria document one can then compare the numeric significance/frequency product for other documents in the dataset with the search document to do comparisons of aggregate similarities (i.e. overlap of words/tokens of importance).

Some embodiment of the present invention may be implemented in the form of a methodology that forms a paradigm that is fundamentally sound and extensible (e.g. multiple documents, an existing document that is augmented with some text supplied by the researcher or subsections of documents can be used as the search criteria to point to other related documents).

BRIEF DESCRIPTION OF THE DRAWINGS

Some embodiments of systems, apparatuses and/or methods configured in accordance with the present invention are now described, by way of example only, and with reference to the accompanying drawings.

FIG. 7 depicts a webpage displaying a collection with each document/webpage having a table associated therewith.

FIG. 11 depicts a method configured in accordance with an embodiment of the present invention for enabling search results for multiple datasets to be compared using normalized similarity scores for documents of the datasets.

DETAILED DESCRIPTION OF THE DRAWINGS

It is contemplated that a method described herein, which is configured in accordance with an embodiment of the present invention, can be implemented as software, including a computer-readable medium (e.g., a non-transitory computer-readable medium) having program instructions executing on a computer, hardware, firmware, or a combination thereof. The method described herein also may be implemented in various combinations on hardware and/or software.

Figure 1:
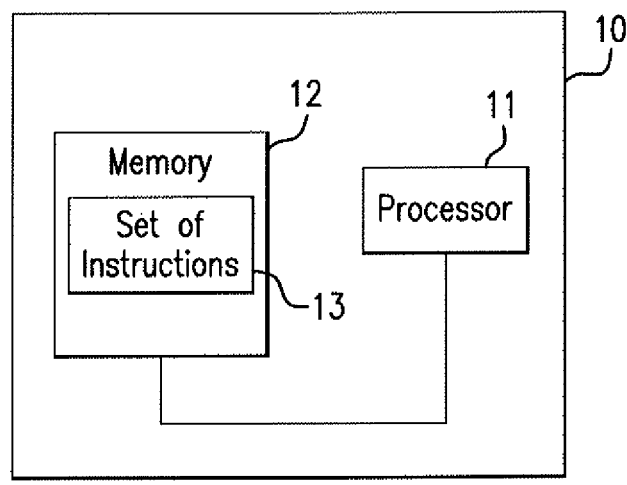
FIG. 1 depicts a device (e.g., a system or apparatus) configured in accordance with an embodiment of the present invention for implementing a method of searching a source of electronically stored documents and collecting, storing and sharing the related documents from the search.

FIG. 1 depicts a device 10 configured in accordance with an embodiment of the present invention for implementing the method of searching a source of electronically stored documents and collecting, storing and sharing the related documents from the search. The device 10 has a memory 12 containing a set of instructions 13 and a processor 11 for implementing the set of instructions 13. The set of instructions 13 may include instructions for: allowing a user to sign into an account using any of a plurality of approved website accounts; selecting at least one category of sources; selecting at least one source (i.e. a collection or set of documents) within at least one category of sources; utilizing search terms/criteria to search the at least one source; returning related documents from the at least one source based on the search terms; collecting any of the related documents into a collection; permitting at least one related document returned to be selected for a further search utilizing the content of the at least one related document as the search criteria in a selected source to return additional related documents; creating a Uniform Resource Locator (URL) with the collection stored at a location referenced in the URL; and exporting the collection of related documents by sending the URL associated with the collection to other selected users via any electronic method, including social networking websites and electronic mail services.

In preferred embodiments of the present invention, default categories and sources are utilized, allowing the categories and sources to be automatically selected without user involvement.

The set of instructions 13 may further include instructions wherein collecting any of the related documents into a collection involves identifying the related documents to be stored from the at least one source.

Alternatively, the set of instructions 13 may include instructions for utilizing a document such as a webpage to automatically conduct a search of designated sources for documents related to the document based on the content in the document and instructions for displaying the related documents found in the search in a collection and storing the collection under a single URL that can be utilized to display the collection.

In conducting a search of a source, also known as a dataset, for other documents related to a document based on the content/text in the document, a computing process is run that assimilates the entire dataset to prepare the necessary data structures. Thereafter, any document whether it resides in the dataset or not, can have its similarity score calculated against every document in the dataset.

For each document in a dataset, the computing process should parse out the relevant text from any markup. For example, if the markup language in a document contains <title> Searching Techniques <title>, the relevant text "Searching Techniques" is parsed out and the two instances of <title> in the markup language are removed. By further way of example, parsing out relevant text may also involve only utilizing the text of a blog article and ignoring the comments contained in the blog. Often the comments in a blog are drafted by numerous authors, resulting in inconsistent and/or inaccurate term usage. Hence, a researcher may determine that counting the appearances of certain terms/words by including the blog comments may not increase the accuracy of search results.

The computing process should also lowercase or uppercase all letters in the text of documents in the dataset and may correct misspellings. This approach helps create consistency when terms are being counted and compared between any two documents. The computing process also determines tokens in each document. For example, each word in a document can be considered a token.

The computing process should further remove tokens that are stopwords. For example, definite and indefinite articles or transitional phrases should be removed as they are less likely to be useful in determining similarity scores between documents.

The computing process should also stem each token in the documents. Stemming each token may involve removing prefixes and suffixes from words to utilize them in the similarity calculation between two documents.

The computing process may also transform phrases into individual tokens by, for example, taking a multiword phrase and making it into a single token in all documents.

The computing process may also associate each token with particular sections of the document. For example, a word that is used in the title may be weighted more heavily than the same word being used in the regular text of the document (e.g. the frequency count for that token may be transformed/increased to account for a token's use in the title).

In preferred embodiments of the present invention, the computing process generates a frequency count of tokens for each document (i.e., a first frequency count). The computing process may transform the count of any given token based on the sections it is associated with and may also normalize the counts such that the length of the document is less relevant or not relevant. For example, ten occurrences of a word in a single page document could be normalized to be equivalent to fifty occurrences of the same word in a five-page document.

The computing process may also transform the token counts in ways deemed appropriate for the language or nature of the dataset. In certain languages, certain words may have more significance than other words in that same language. Hence, certain words may be weighted more heavily in conducting a similarity calculation.

The computing process may also involve calculating other statistics that apply to each token. For example, a word's distance away from the front of a document may be calculated and used to transform the token counts, if desired.

In preferred embodiments of the present invention, the computing process inverts the data such that each token has a set of documents it resides in, along with the associated counts for each token and potentially other statistics obtained through the computing process.

The computing process may, for each token in the set of unique tokens in the dataset, determine a numeric value that measures the magnitude of its significance in the dataset. For example, a word that occurs few times in the dataset may be deemed more important than a word that occurs many times in the entire dataset. Therefore, if one is searching a patent dataset such as the United States Patent and Trademark Office patent database for a word very commonly used in this type of dataset such as "claim" or "comprising" then these words will be given very little weight in the final calculation of the product of the significance magnitude and numeric frequency calculation (i.e. the similarity calculation) despite high numeric frequency scores in the documents. On the other hand, if a word is rarely used in a dataset (e.g. "interstellar" in the patent database) then this word will be weighted much more heavily in conducting similarity calculation.

This step of the computing process related to determining a numeric value that measures the magnitude of each token's significance in the dataset is not used in transforming any of the data from the other steps. If such a transformation did occur, then whenever new documents were added to the dataset, all or many of the other steps (or subsets of these steps) of the computing process would need to be rerun. This type of duplicative processing would be expensive. Moreover, if a user wanted to alter the weighting assigned to the step of determining a numeric value that measures the magnitude of each token's significance in the dataset to determine how it affects the quality of the similarity scores, all or many of the steps would also need to be rerun.

For any given document of text (or in some cases simply text typed in by a user or input from multiple documents), a similarity calculation determines for each other document in the dataset a numeric similarity score. The computing process to determine the similarity score involves, with the possible aid of the statistics calculated during the computing process, comparing each token's count in a designated document or text (i.e., an artifact or portion thereof that is being searched) to its matching token's count in each other document in the dataset. However, the computing process may not necessarily use a raw count of tokens in a document as a factor in the similarity score. In some embodiments of the present invention, it may be preferable to use a logarithmic transformation of the raw token count to decrease the magnitude rather than the raw number itself for the numeric frequency factor. For a given token, the magnitude of closeness of the two such token counts (or their derivatives) between two documents has a directly proportional contribution to the magnitude of the similarity score (i.e. the closer the token counts are for each token included in two compared documents, the more significant the contribution to improving the similarity score).

The computing process to determine the similarity score may further involve including an inversely proportional contribution to the magnitude of the similarity score for tokens that are in the designated document but not in another document in the dataset being compared to the designated document or for tokens that are not in the designated document but are in another document in the dataset being compared to the designated document. A token with a high token count in a first document that does not appear at all in a second document being compared to the first document will make a more significant contribution to reducing the magnitude of the similarity score than a token with a low token count in a first document that does not appear at all in a second document being compared to the first document. Moreover, the greater the number of tokens that appear in a first document and not in a second document being compared to the first document and vice versa, the more significant the contribution to reducing the magnitude of the similarity score.

Whenever the step of determining a numeric value that measures the magnitude of each token's significance in the dataset is utilized in the computing process, a given token's value of significance has a directly proportional contribution to the magnitude of the similarity score between two documents. In other words, if a particular token's value of significance is high, then the closeness of that particular token's count between documents is of increased importance in the similarity calculation between those documents. In a preferred embodiment of the present invention, this means that if a given token count is exactly the same in a designated document and a compared document, the higher the value of significance for that particular token, the more favorable impact that exact token match will have in the similarity calculation between the documents.

The similarity calculation should be applied in such a manner that a perfect similarity score between two documents can only be obtained if all of the token counts in the designated document match all of the token counts in the compared document and all of the token counts in the compared document match all of the token counts in the designated document and all such token values of significance for all tokens in the designated document and the compared document are equal to the maximum value in the entire set of values of significance (i.e. the maximum value of significance given to any token in the dataset is given to each token in the documents).

By conducting such a similarity calculation for all documents in a dataset, the top N most similar documents or least similar documents to a designated document or text can then easily be obtained. A given similarity score is consistently comparable to any other similarity score in the dataset, but it may not be comparable to a similarity score calculated by passing the designated document through some other entirely different dataset. Because the process defines that a similarity score is calculated for every document in the dataset, that total set of similarity scores can be used to normalize each of those similarity scores to something comparable across datasets. Given extremely normalized similarity scores (i.e., normalized similarity scores that are highly different from each other), a given designated document can yield a useful single set of similar documents derived from multiple datasets, by applying the condition that a given normalized similarity score is beyond some standard threshold. It is important to note that while a high similarity score may often be better based on the computing process, it can also be the case that a low or average score would produce the best match of similar or dissimilar documents in certain situations.

To implement the above-described computing process for searching a source, also known as a dataset, for other documents related to a document based on the content in the document (i.e. the text of the document used as the search criteria), the set of instructions 13 may further include instructions for: parsing out the relevant text from any markup in a document and all documents in the source; lowercasing or uppercasing all letters in the text of a document and all documents in the source; correcting misspellings of words in a document and all documents in the source; determining tokens in a document and all documents in the source; removing tokens that are stopwords from the document and all documents in the source; stemming each token in the document and all documents in the source; transforming phrases into individual tokens in the document and all documents in the source; associating each token with a particular section in the document and all documents in the source; obtaining a frequency count of the tokens for the document and all documents in the source; transforming the count of any given token based on the sections it is associated with in the document and all documents in the source; normalizing the counts of the tokens for the document and all documents in the source; transforming the counts of the tokens in ways deemed appropriate for the language or nature of the dataset for the document and all documents in the source; calculating other statistics that apply to each token in the document and all documents in the source; inverting the data such that each token has a set of documents it resides in from the source, along with the associated counts and statistics; and determining a numeric value that measures the magnitude of each token's significance in the source. Some but not necessarily all of the computing instructions set out above may be used in the subject invention.

The set of instructions 13 further include instructions for: comparing each token's count (or derivative) in a document to its matching token's count (or derivative) in another document in the source wherein the magnitude of closeness of the two counts has a directly proportional contribution to the magnitude of the similarity score between those documents. The set of instructions 13 may further include instructions for: determining which tokens are present in the document but not present in other documents and vice versa in the source and including an inversely proportional contribution to the magnitude of the similarity score between the document and another document based on the magnitude of each such tokens' count and the total number of each such tokens; utilizing a token's value of significance to include a directly proportional contribution to the magnitude of the similarity score based on the closeness of a token's count between the document and each other document in the source; sorting the set of similarity scores from the source; and displaying the similarity scores from the source in ascending or descending order.

In preferred embodiments, indexing a document in a "flat" manner that counts words (i.e., tokens) rather than comparing them using proximity searches, Boolean logic and other logic algorithms is desired. The term "flat" as used herein shall mean that the search engine and indexing of a document does not attempt to understand the meaning of a word/token, its context vis-à-vis any other particular word or token or its proximity to other words/tokens. Indexing in a flat manner refers to only determining the overall words/tokens used within the dataset upfront and wait to determine the similarity/relevance in real-time at the time of the sear criteria based search as opposed to prior art approaches that require creating a "deep" decision tree of all the possible combinations and relationships within a dataset prior to or exclusive of any subsequent searching based on search criteria. In this regard, embodiments of the present invention are not directed to how documents in a dataset compare to each other (i.e., deep search) but are directed to implementing searching in a manner that (a) compares the search criteria/seed to each individual document in the dataset and (b) overlays the intersection of any two document pairs against the dataset as a whole (i.e., is shallow search that only goes 2 levels deep). Searches implemented in accordance with preferred embodiments of the present invention do not attempt to compare a search seed to multiple documents, but rather do a 1-to-1 analysis with overall dataset overlay. A beneficial aspect of searching in this manner is that it allows one to search not just full documents but also URLs (i.e., In the context of the present invention, search criteria can be a URL).

A flat search refers to a search in which an algorithm counts both the number of times a unique word (token) is used in a dataset of multiple documents and also the number of times the same unique word is used in a search criteria document. The flat search then gives the individual word (token) a numeric value characterizing a magnitude of significance (i.e., significance magnitude factor) in the search criteria (i.e., document representing the search criteria) that is the product of the frequency of the use of the word in the search criteria document (this frequency could be logarithmic) and the significance of the word in the dataset (the significance score in the dataset is inversely proportional to frequency of use in the dataset). The frequency of the use of the word in the search criteria document is determined via a first frequency count that characterizes a number of times that each one of the tokens occurs within the text search criteria and the significance of the word in the dataset is determine d via a second frequency count that characterizes an aggregate number of times that a particular one of the tokens of the search criteria occurs within all of the documents in the dataset). As the significance magnitude factor for each unique word are aggregated, each document in the dataset receives an aggregated numeric similarity score (i.e., similarity score) in comparison to the search criteria document. It is important to note that flat searches as defined herein do not rely upon logic, proximity or any other attempts to understand the meaning of individual words.

In order to speed up the searching of the dataset, it may be desirable (although it is not necessary because of the speed and efficiency of flat searches described herein) to screen out documents in the dataset by picking out the token or tokens with the highest similarity scores (e.g. numeric frequency factor times significance magnitude) in the search document (i.e. words that are used often in the search document and that are not used often in the dataset being searched) and only do similarity searches on documents in the dataset that have these highest ranking tokens. For example if the word "interstellar" is used 100 times in a patent (i.e. the search document) and one is searching the US patent database (i.e. dataset) for similar patents and applications it may be desirable to only look at the patents and applications that contain that word. This may dramatically increase the speed of the search of the dataset since one would be searching only hundreds or perhaps thousands of patents rather than the 8 million plus patents in the US patent database. From time to time this screening process may miss an important document but the increase in speed and the ability to dramatically cut back in computing power may make this screening process worthwhile.

Figure 2:
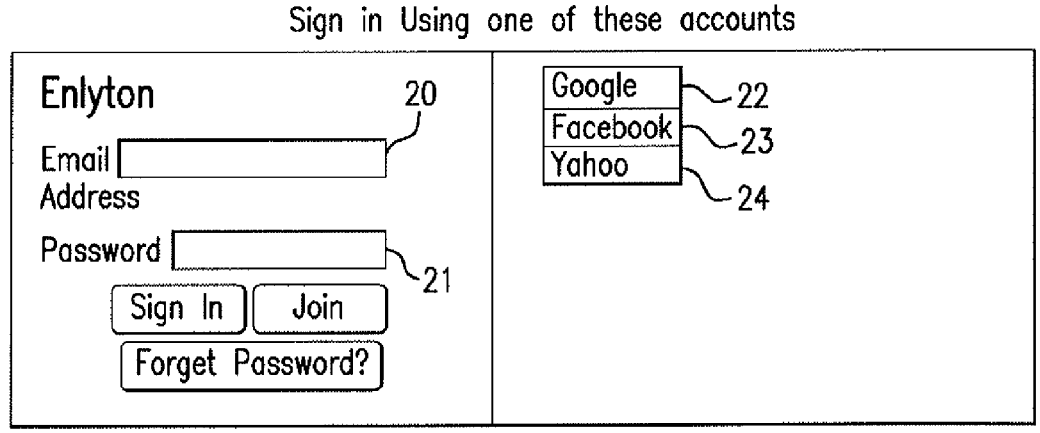
FIG. 2 depicts a screen shot of an exemplary sign-in webpage used in accessing a website to perform a methodology configured in accordance with an embodiment of the present invention for searching a source of electronically stored documents.

FIG. 2 depicts a screen shot of an exemplary sign-in webpage used in accessing a website to perform the preferred methodology for searching a source of electronically stored documents. In this example, a researcher can log into a designated website (e.g., a website referred to herein as "the Enlyton website") website using an e-mail address field 20 and password field 21 from any of a variety of different accounts. For example, a Google, Yahoo or Facebook account could be utilized for purposes of signing into the Enlyton website for conducting a research project utilizing the Google tab 22, the Facebook tab 23 or the Yahoo tab 24.

Figure 3:
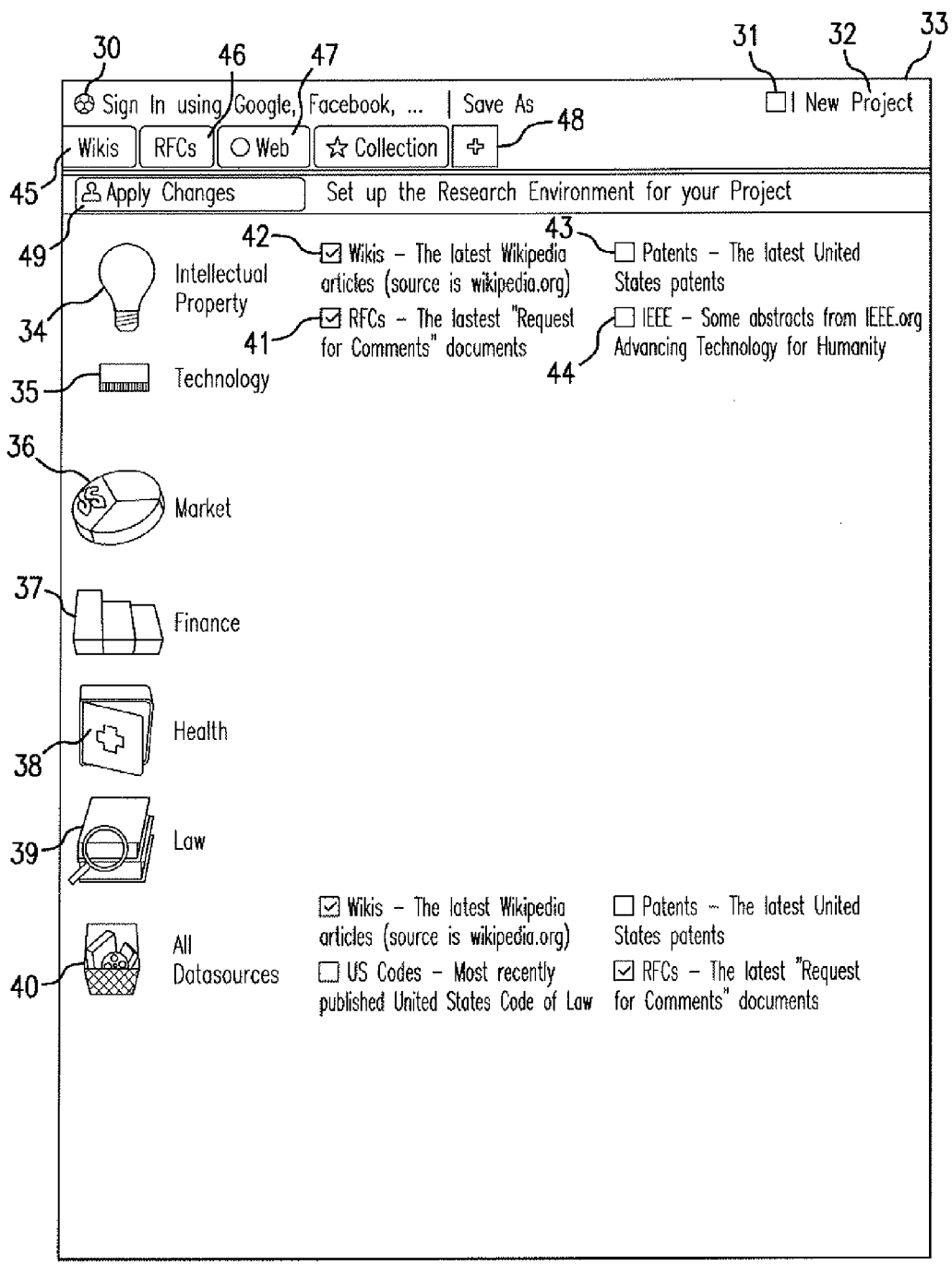
FIG. 3 depicts an interactive webpage for use in setting up a search environment in an embodiment of the present invention.

FIG. 3 depicts an interactive webpage for use in setting up the search environment in a preferred embodiment of the present invention. After signing into the Enlyton website, an interactive webpage 33 is displayed. At the top of the webpage, several icons and links are displayed. One sign-in icon 30 permits a researcher to sign in from a different account (e.g. Yahoo, Google or Facebook). A disk icon 31 permits a user to save a current project by clicking on the disk icon 31 and following the instructions. Alternatively, a new project tab 32 allows a user to create a different project by clicking on it.

The interactive webpage 33 also permits the researcher to select the proper research environment for a search. For example, various categories of documents and related icons are shown on the left side of the webpage 33. These categories include: Intellectual Property 34, Technology 35, Market 36, Finance 37, Health 38, Law 39 and All Datasources 40. Obviously, the categories listed are merely illustrative and other categories of documents may also be created. The categories ideally have several different sources associated with each category, which are available for searching. The All Datasources 40 is an all-inclusive category wherein a researcher can select from all available sources for searching.

For example, under Intellectual Property 34, a researcher can select whether to search the Request for Comments (RFCs) 41, Wikipedia articles (Wikis) 42, the United States Patent and Trademark Office patent database (Patents) 43, the Institute of Electrical and Electronic Engineers (IEEE) articles 44 or whatever other sources are available for searching. In this embodiment, a user simply clicks in the box icon associated with any or all of these sources to create a check mark inside the associated box.

After selecting the appropriate research environment, all selected sources will appear at the top of the webpage 33 in tabs. In the example depicted in FIG. 3, the researcher has only selected Wikis 42 and RFCs 43 under the Intellectual Property category. Hence, only the Wikis tab 45 and RFCs tab 46 appear at the top of the webpage as searchable data sources along with the Web tab 47 which allows a researcher to conduct an Internet search. A plus symbol tab 48 which allows a researcher to change the research environment to add other sources at any time also appears at the top of the webpage 33. If a researcher clicks on the plus symbol tab 48, he can change the research environment and click on the apply changes tab 49 to add or subtract sources. As can also be seen in FIG. 3, the corresponding sources are also checked in the All Datasources 40 category when Wikis 42 and RFCs 41 are selected under the Intellectual Property Category 34.

After the proper research environment is created, a researcher then clicks on the desired source tabs to conduct a search specific to that source. For example, a researcher could click on the Wikis tab 45 to search the indexed Wikipedia articles related to whatever search terms the researcher inputs.

Figure 4:
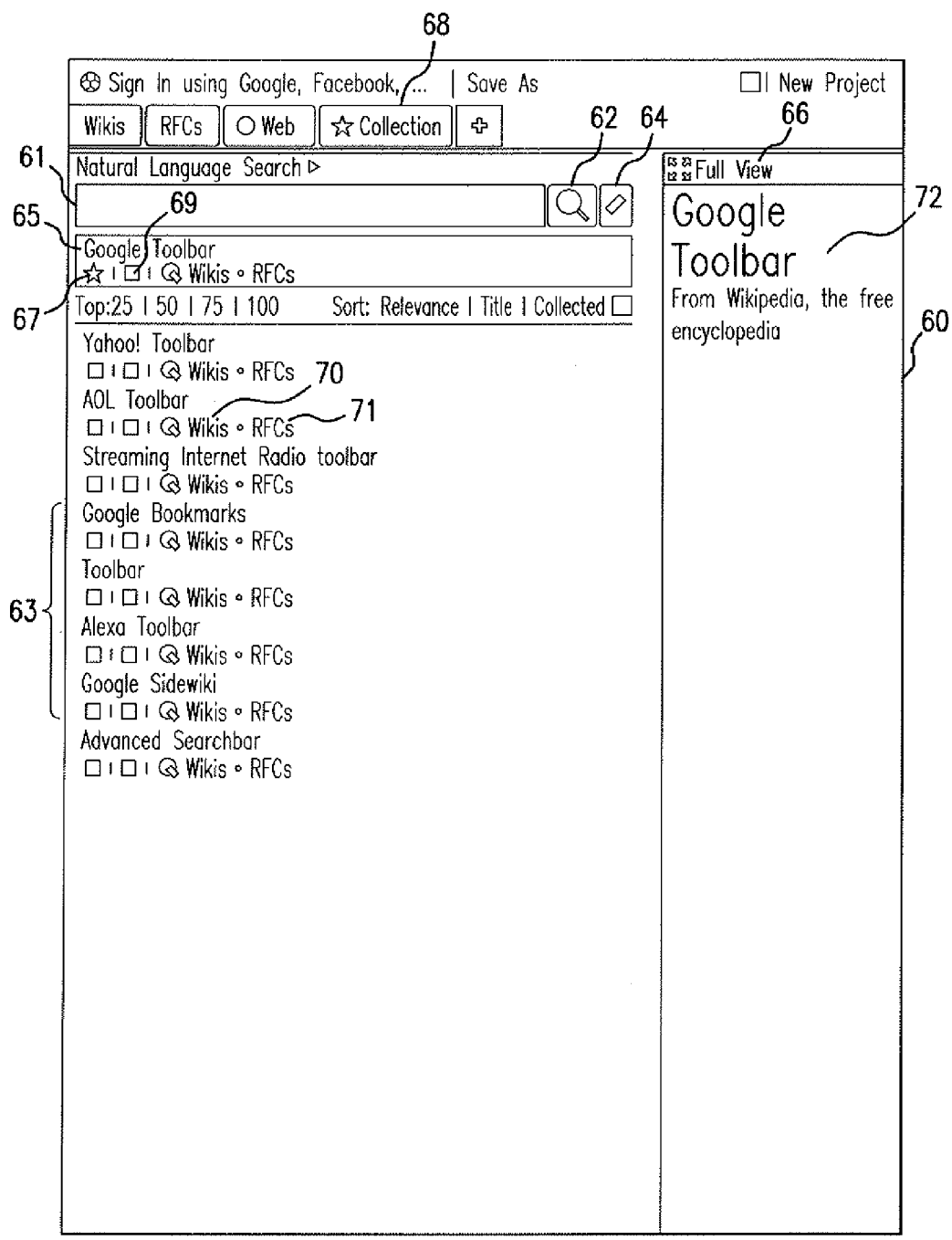
FIG. 4 depicts an interactive webpage for use in conducting a search associated with a preferred embodiment of the present invention.

FIG. 4 depicts an interactive webpage for use in conducting a search associated with a preferred embodiment of the present invention. A researcher may enter desired search terms into the natural language search box 61 shown on the interactive webpage 60. Preferably, the researcher will utilize many relevant search terms or cut and paste portions of documents or entire documents into the natural language search box 61 to create the search terms. The computing process of a preferred embodiment of the present invention described in conjunction with FIG. 1 allows the entire text inserted as search terms/criteria to be utilized in conducting a search for related documents in a given source. Because the use of the entire text of the documents is often the best search criteria, the researcher is encouraged to submit as much text as possible. This use of large amounts of text or entire documents either cannot be entered into typical search engines (e.g. Google, Bing, Yahoo) or causes them to give error messages or to break down. If a researcher desires to emphasize the importance of certain search terms, he can insert emphasis (such as three asterisks) next to certain language to accentuate this language during the searching methodology. This additional emphasis will be utilized in the computing process to increase the designated tokens' value of significance by either increasing the magnitude of the significance factor or increasing the numerical frequency factor (or a combination of both).

In preferred embodiments of the present invention, the text inserted as the search criteria (e.g. full document) to be utilized in conducting the search for related documents is a URL itself. A uniform resource locator, abbreviated URL, is also sometimes known as web address. It is a specific character string that constitutes a reference to a resource. In web browsers, the URL of a web page is typically displayed on top inside an address bar. An example of a typical URL would be "http://www.enlyton.com/".

Traditional search engines (e.g. Google, Yahoo, Bing and so forth) cannot search URLs themselves for various reasons (e.g. too many words to search). However, in the case of a discovery engine configured in accordance with an embodiment of the present invention, it is possible to use a URL as the search criteria for a full document search. The URL of interest can be automatically curated (e.g., transformed) into the form of an XML (Extensible Markup Language) file or other suitable text-based file format (e.g., JAVA Script Object Notation (JSON) format) that can be linked or associated with the URL.

While HyperText Markup Language (HTML) is the main markup language for creating web pages and other information that can be displayed in a web browser, the discovery engine disclosed herein can transform the HTML file or other file format of URL content (which tells the browser how to display the underlying content) and convert it into an XML file or other suitable text-based file format which is a preferred way to structure, store and transport content. This is important because XML data is stored in text format. XML makes it easier to expand or upgrade to new operating systems, new applications, or new browsers, without losing data. This is crucial because one of the most time-consuming challenges for developers is to exchange data between incompatible systems over the Internet and exchanging data as XML greatly reduces this complexity, since the data can be read by different incompatible applications. In this regard, XML file format and other suitable text-based file formats are formats that are preferred formats for search criteria generated from URL content. Additionally, it is disclosed herein that, although HTML is a primary type of file format for URL content, search criteria used in association with embodiments of the present invention can be URL content in a file format/mark up language other than HTML (e.g., an open source file format such as TXT, SDF, XML; a proprietary file format such as PDF, PPT, WORD; etc).

Even when using XML, it may be desirable to screen out the other non-mark up superfluous content from the basic content of the URL. This superfluous content is sometimes referred to as "chrome" and it can include text in the URL that is unimportant to the core content of the URL. For a URL to be used as the search criteria, the computing process should parse out the relevant content from any markup. For example, if the markup language in a document contains <title> Searching Techniques <title>, the relevant text "Searching Techniques" is parsed out and the two instances of <title> in the markup language are removed. Generally, strings of unicode that constitute markup either begin with the character < and end with a >, or they begin with the character & and end with a. Strings of unicode characters that are not markup are typically content but this is not always the case. In addition to mark up language other types of chrome that may need to be screened out of the URL include, advertising, pictures, graphics and so forth. The term "chrome" as used herein can mean any text, mark up, pictures, graphics etc that are not XML text important to the understanding of a document.

The natural language search box 61 allows a researcher to input text and then click on the magnifying glass icon 62 to conduct the search and return a list 63 of related documents. The researcher may also clear the dialog box by clicking on the eraser icon 64. In this example, "Google Toolbar" has been inserted into the natural language search box 61 and a search related to these search terms has been conducted in the Wikis source. The results are displayed on the left side of the page in a list 63 of related documents and a condensed view 72 of a selected related document 65 is shown on the right side of the page. A user can click on the Full View icon 66 to see the full view of the related document displayed. In this case the selected related document 65 is the Wikipedia entry/webpage for "Google Toolbar."

When the list 63 of related documents appears after a search is conducted, the researcher then has the ability to select the star icon 67 associated with each document retrieved from the search to add the document to a collection. After at least one document has been added to the collection for a given research project, a Collection tab 68 will appear at the top of the webpage 60 and can be clicked on to view any and all collected documents. A researcher can also click on the paper icon 69 to add a comment specific to any related document found in the search. The comment will appear in the collection in a comment box specific to the related document.

If a researcher determines that a specific related document is extremely relevant, he can simply click on any of the source links also listed next to that reference to conduct a search for documents contained in that source. This search is referred to herein as a "more like this" or "MLT" search. The MLT search is then conducted utilizing the text of the extremely relevant related document as the search criteria to find related documents in the other source based on the previously described computing process.

For example, if the user determines that the "AOL Toolbar" Wikipedia entry is extremely relevant, he may click on the RFCs icons 71 next to the Wikis icon 70 under the "AOL Toolbar" entry. This causes a search automatically to be performed to find related content in the RFC source that relates to the content contained in the "AOL Toolbar" Wikipedia entry. The previously described computing process utilizes the text of the "AOL Toolbar" Wikipedia webpage/entry as the search criteria in performing a search to uncover related documents in the RFC source.

Figure 5:
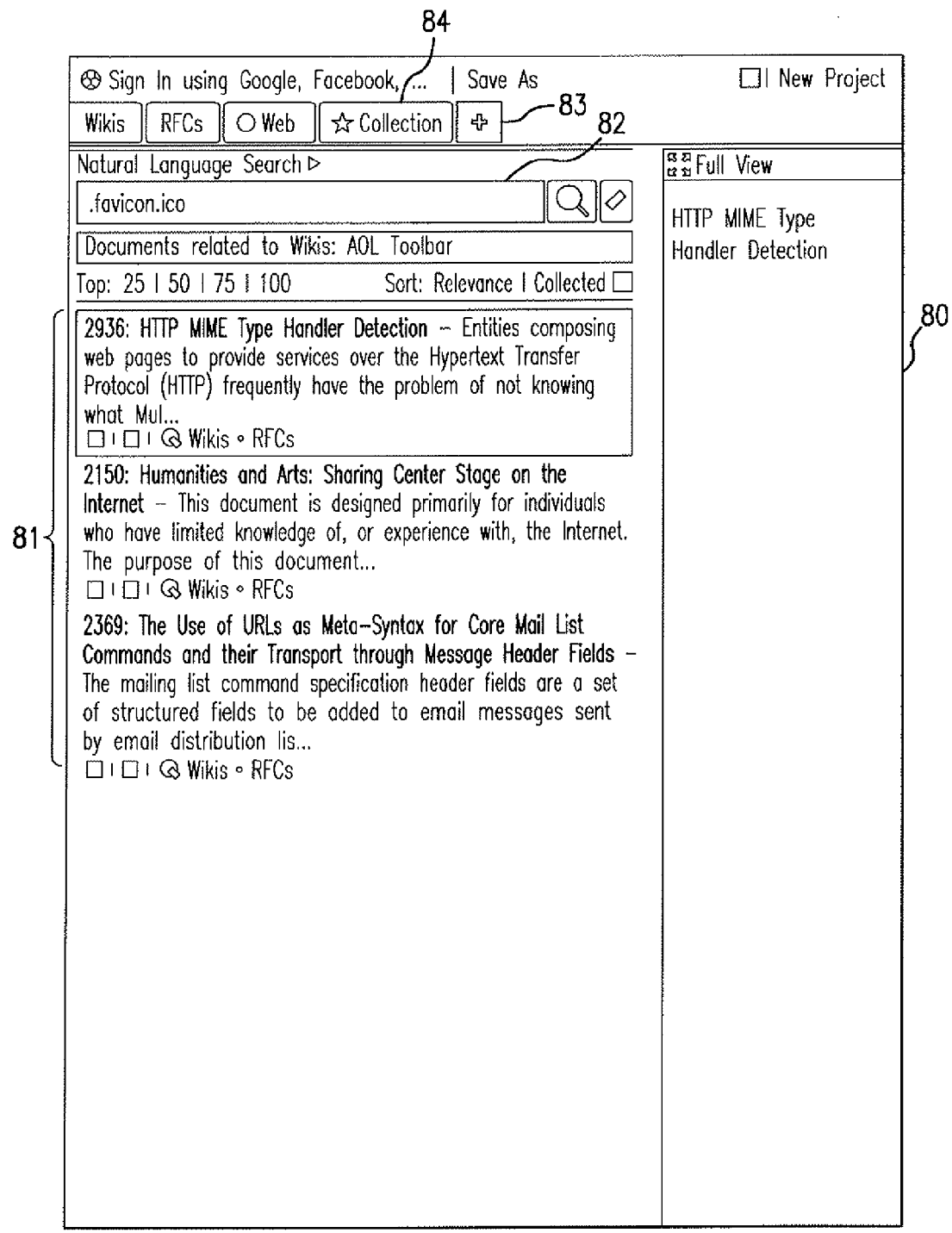
FIG. 5 depicts another interactive webpage for use in conducting a search in accordance with an embodiment of the present invention.

FIG. 5 depicts another interactive webpage for use in conducting a search associated with a preferred embodiment of the present invention. The interactive webpage 80 shows the results from conducting a search in the RFC source based on the text/entire content of the Wikipedia webpage for "AOL Toolbar." A list 81 of RFC webpages/documents that contain related information to the "AOL Toolbar" Wikipedia webpage is displayed on the left side of the screen. A condensed view of the first RFC entry from that list is displayed on the right side of the interactive webpage 80.

A researcher also may continue his search by putting search criteria/terms into the natural language search box 82 for another source and continue to add documents to the collection. If the researcher wants to add or subtract the sources to be searched, he can click on the plus symbol icon 83 to alter the different sources that appear on the interactive webpage 80. If a researcher chooses to add a link to the collection of documents, he can simply select the collection tab 84.

Figure 6:
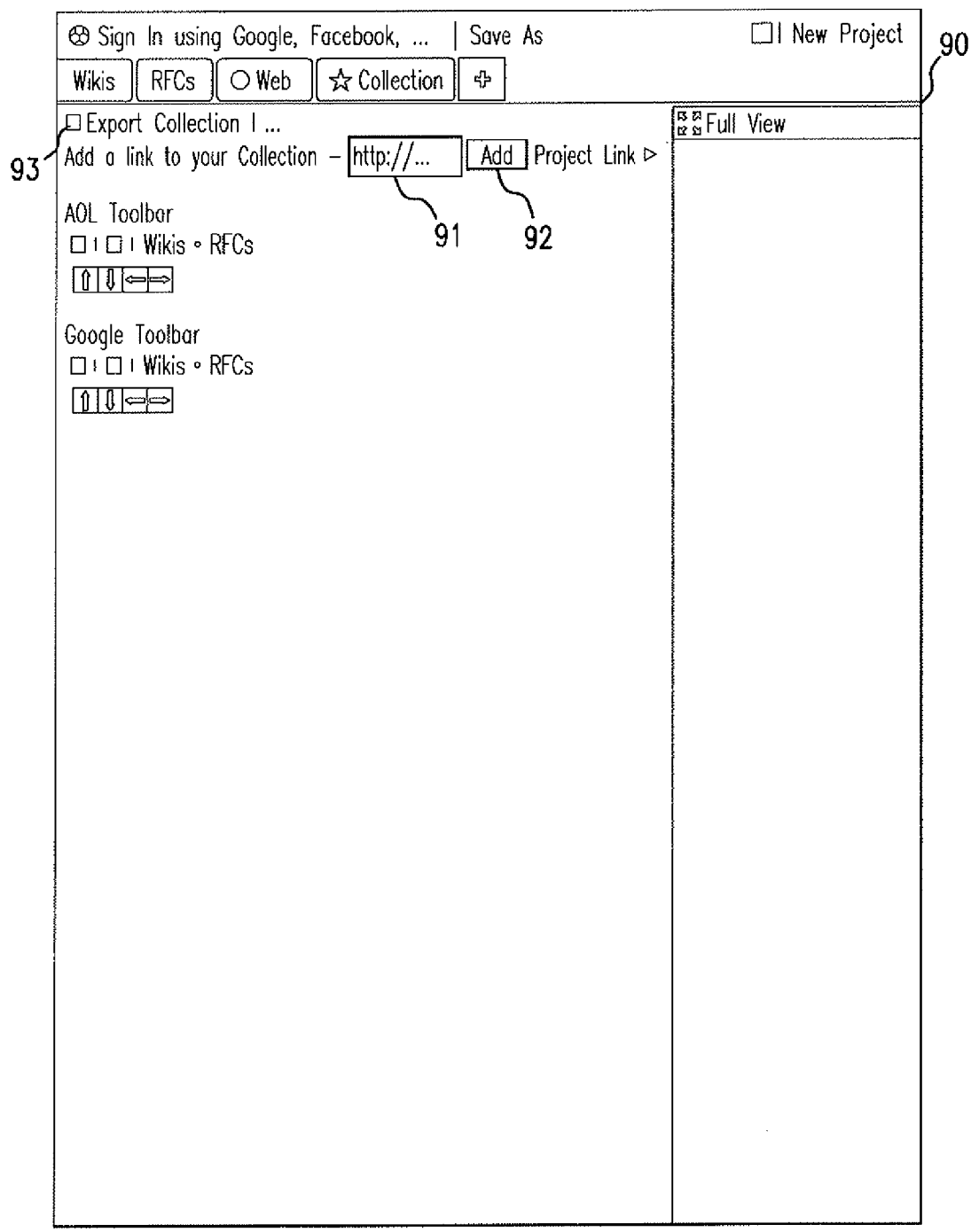
FIG. 6 depicts another interactive webpage for use in conducting a search in accordance with an embodiment of the present invention.

FIG. 6 depicts another interactive webpage for use in conducting a search associated with a preferred embodiment of the present invention. If a user selects the collection tab, an interactive webpage 90 will appear. The interactive webpage 90 allows a user to type a link into the dialog box 91 and select the additional link tab 92 if the user chooses to add a specific link to his collection. Alternatively, the researcher could simply select the export collection link 93 to permit the collection to be shared with others. The entire collection can then be sent via single URL to another individual who could then view the contents of all documents in the collection by selecting the URL.

FIG. 7 shows a webpage displaying a collection. When a user selects the URL containing the collection, each individual document/webpage in the collection will be displayed with a table associated therewith. In FIG. 7, Table 100 is associated with the Wikipedia webpage for "Google Toolbar" and table 101 is associated with the Wikipedia webpage for "AOL Toolbar." Table 100 has a Location field 102, Comments field 103 and Title field 104. Likewise, table 101 has a Location field 105, Comments field 106 and Title field 107. The Location field shows the URL associated with each collected document. The Comments field displays any comments entered by the user related to the collected document, and the Title gives the title of each document in the collection. In some embodiments of the present invention, the entire text of the document/webpage will be displayed beneath the table for each document/webpage.

Figure 8:
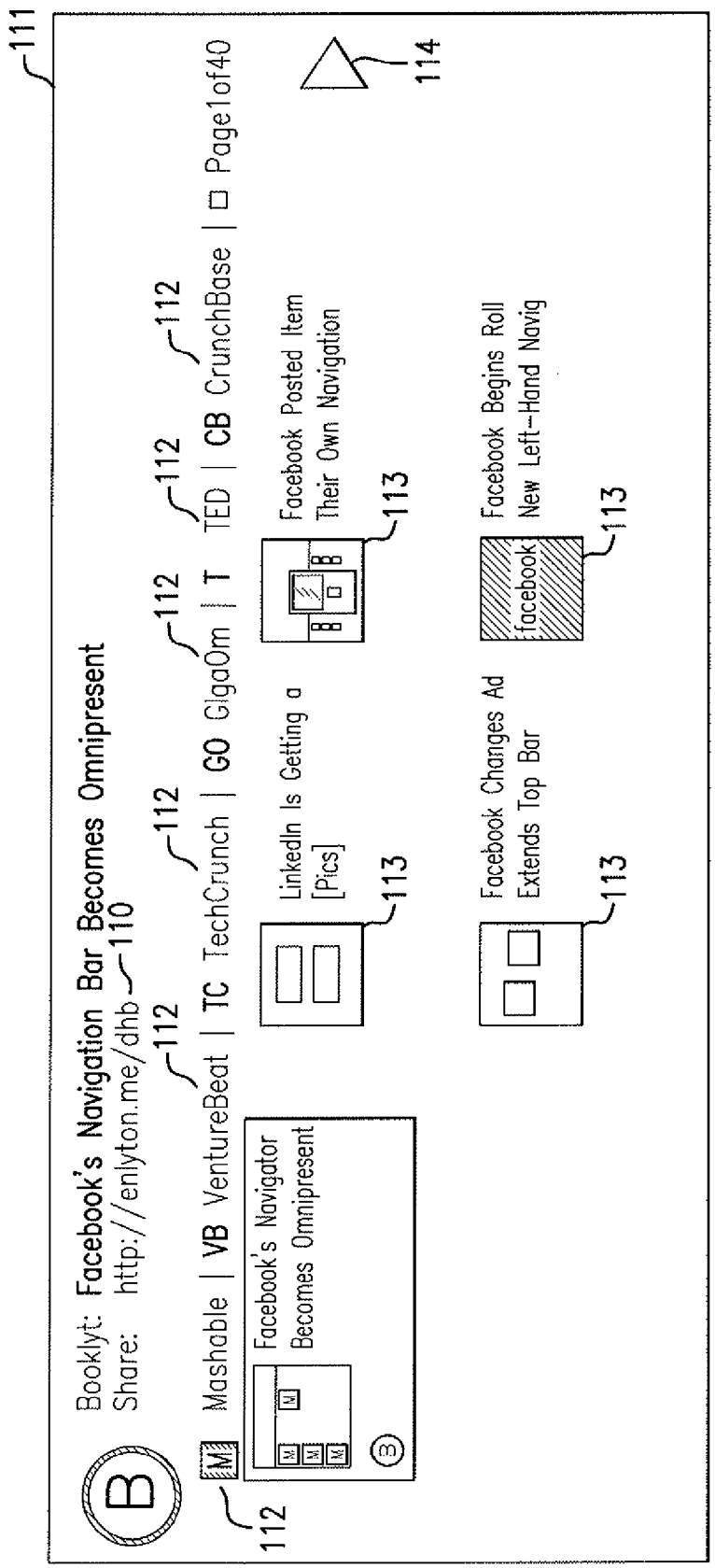
FIG. 8 displays a webpage displaying an electronic magazine (electronic document collection) that can be stored and shared via a single URL.

FIG. 8 displays a webpage displaying an electronic magazine (electronic document collection) that can be stored and shared via a single URL. The URL 110 is listed at the top of the webpage 111. The various sources 112 searched are also shown at the top of the webpage 111. The electronic magazine is a data collection created by utilizing the computing process of the present invention. The electronic magazine contains webpages/documents found via searches of the sources 112 listed at the top of the webpage 111. The search criteria or search terms involve the entire document/webpage shown first in the list. In FIG. 8, all of the text from a webpage entitled "Facebook's Navigation Bar Becomes Omnipresent" contained in the Mashable.com source served as the search criteria/terms and all sources 112 were searched using this search criterion to create the electronic magazine with related documents 113 from each source 112 displayed. In FIG. 8, forty results were returned but only some are displayed. A user can click on the arrow 114 on the right side to view more results.

The URL 110 associated with the electronic magazine is completely portable. Anyone that clicks on the URL 110 will be directed to the electronic magazine (collection). The content in the electronic magazine is unique and updated to deliver new content or sources because each time it is opened, the search is conducted based on the current content of the webpage being used as the search criteria and any new documents available in any of the sources may be added to the electronic magazine each time it is opened. A publisher can simply add a link on its webpage that permits an electronic magazine to be created based on the content contained in the current webpage as the search criteria. Depending on default conditions or user specifications, the sources searched may be limited or may be anything on the World Wide Web.

The URLs associated with the electronic magazine are portable and can be shared with anyone across any social or messaging platform. The content related to the original page being searched in the electronic magazine is always updated so the electronic magazine is always fresh and not static. There is no active user participation required from the user (rating, identifying, reviewing, ranking etc.) associated with creating and viewing the electronic magazine.

Figure 9:
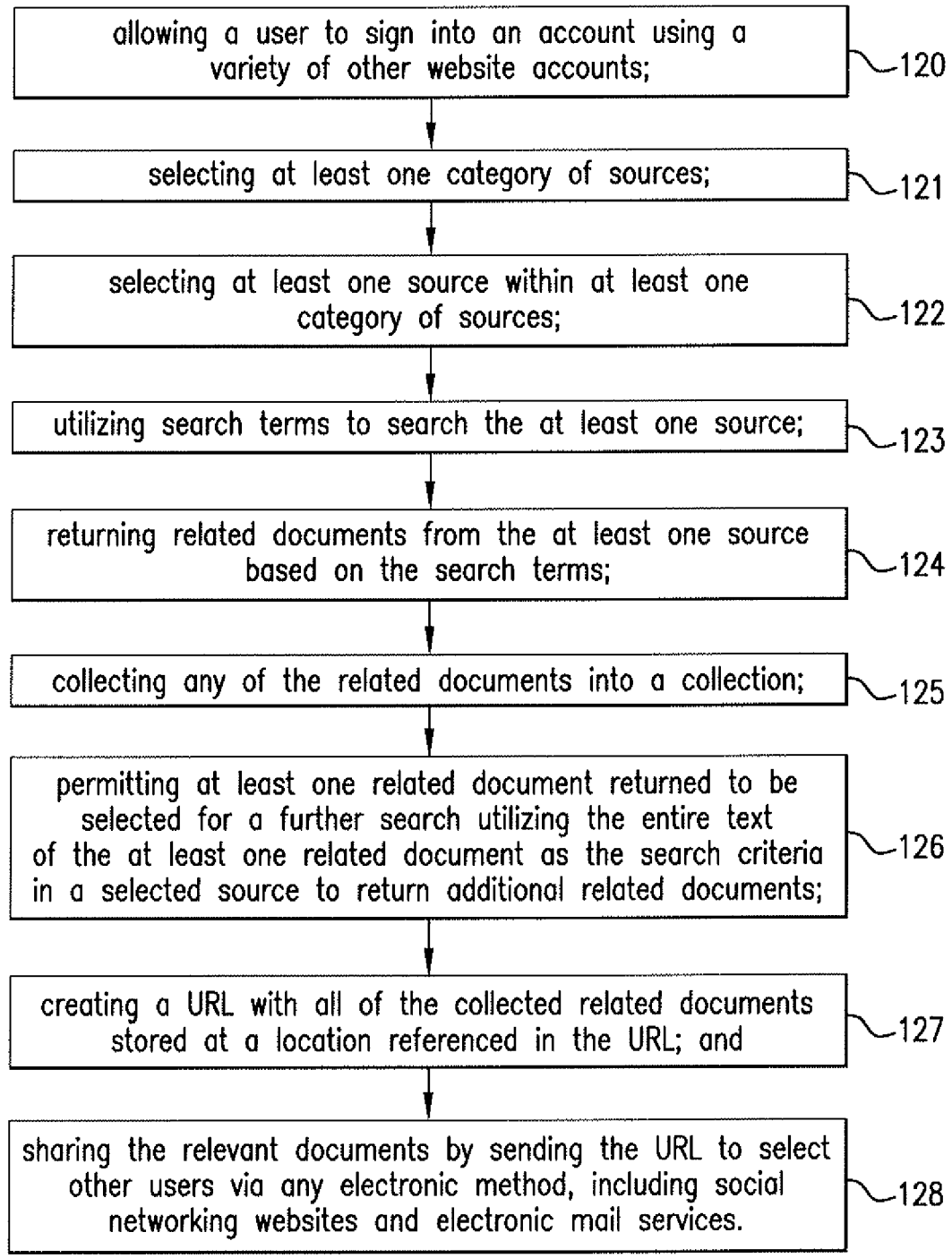
FIG. 9 depicts the methodology configured in accordance with an embodiment of the present invention for searching, collecting, storing and sharing electronic documents.

FIG. 9 depicts the preferred methodology of searching, collecting, storing and sharing electronic documents. The preferred methodology may include the steps of: allowing a user to sign into an account using a variety of other website accounts 120; selecting at least one category of sources 121; selecting at least one source 122 (i.e. a dataset/collection of documents) within at least one category of sources; utilizing search terms to search the at least one source 123; returning related documents from the at least one source based on the search terms 124; collecting any of the related documents into a collection 125; permitting a related document returned to be selected for a further search utilizing the text of the related document as the search terms/criteria in a selected source to return additional related documents 126; and creating a URL with all of the collected related documents stored at a location referenced in the URL 127.

The step of permitting the related document returned to be selected for a further search utilizing the text of the related document as the search terms/criteria in a selected source to return additional related documents may involve: parsing out the relevant text from any markup in the related document and all documents in the selected source; lowercasing or uppercasing all letters in the text of the related document and all documents in the source; correcting misspellings of words in the related document and all documents in the source; determining tokens in the related document and all documents in the source; removing tokens that are stopwords in the related document and all documents in the source; stemming each token in the related document and all documents in the source; transforming phrases into individual tokens in the related document and all documents in the source; associating each token with particular sections of the related document and all documents in the source; obtaining a frequency count of the tokens in the related document and all documents in the source; transforming the count of any given token based on the sections it is associated with in the related document and all documents in the source; normalizing the counts of the tokens between the related document and all documents in the source; transforming the counts of the tokens in ways deemed appropriate for the language or nature of the dataset for the related document and all documents in the source; calculating other statistics that apply to each token in the related document and all documents in the source; inverting the data such that each token has a set of documents it resides in, along with the associated counts and statistics; and determining a numeric value that measures the magnitude of each token's significance in the source. Some but not necessarily all of the computing instructions set out above may be used in one or more embodiments of the present invention.

The step of permitting the related document returned to be selected for a further search utilizing the text of the related document as the search terms/criteria in a selected source to return additional related documents may further involve: comparing each token's count in the related document to its matching token's count in all other documents in the source wherein the magnitude of closeness of the two counts has a directly proportional contribution to the magnitude of the similarity score between the related document and any other given document in the source; determining which tokens are present in the related document but not present in other documents and vice versa in the source and including an inversely proportional contribution to the magnitude of the similarity score between the related document and another document based on the magnitude of each such tokens' count and the total number of each such tokens; utilizing a token's value of significance to include a directly proportional contribution to the magnitude of the similarity score based on the closeness of a token's count between the related document and each other document in the source; sorting the set of similarity scores from the source; and displaying the similarity scores from the source in ascending or descending order. The searching technology discussed herein may not require the use of an extreme amount of computer resources because the indexing of documents and the searching of documents is done in a flat manner which does not involved proximity searching and/or logic searching (e.g. trying to understand the meaning of words by looking for associations with other words).

While it will quite often be the case that a researcher will wish to conduct a search utilizing the entire content/text of a document as the search criteria, it is also possible in certain instances that only a portion of text from a document or text from multiple documents or text input by a user will be used as the search criteria. In such a situation, the computing process will simply utilize such text in creating tokens and comparing such tokens to the documents in a source.

The step of collecting any of the related documents into a collection may involve identifying the related documents to be collected from each source. The step of collecting documents may also be performed to collect additional related documents after any search, including after a further search is performed utilizing the entire text of the at least one related document.

The preferred methodology may further involve sharing the relevant documents by sending the URL to select other users via any electronic method, including social networking websites and electronic mail services 128.

Figure 10:
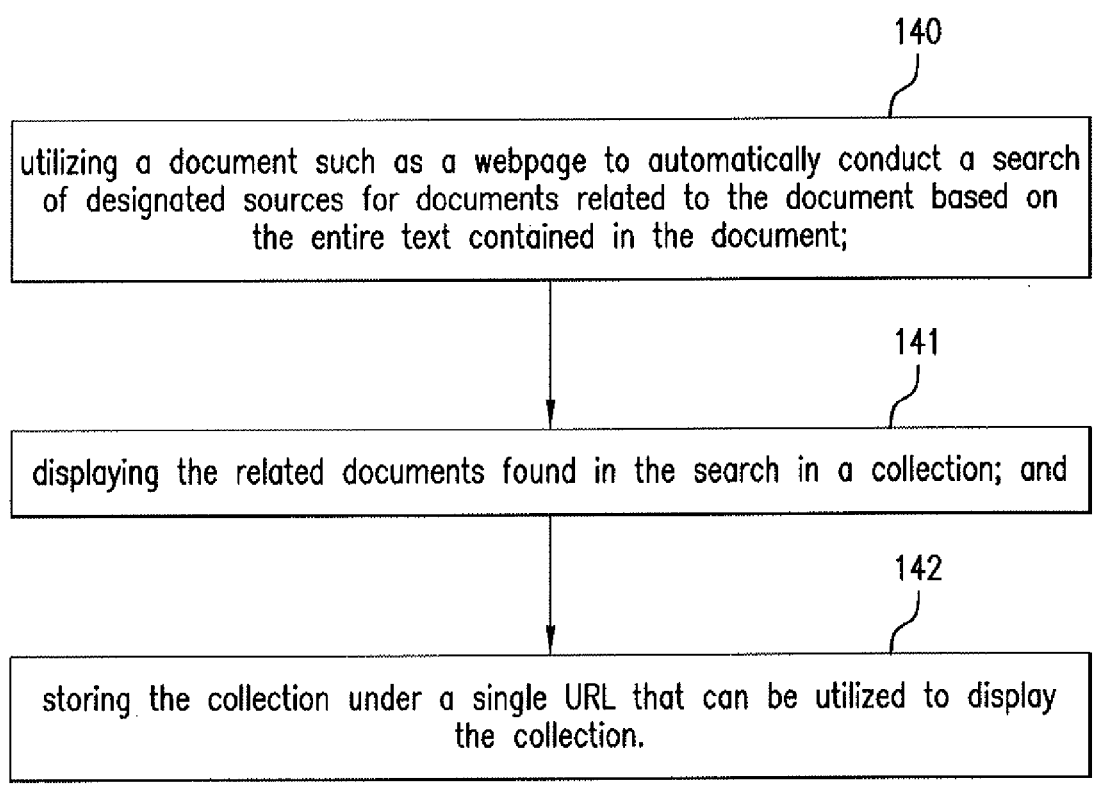
FIG. 10 depicts a methodology configured in accordance with an embodiment of the present invention for creating an electronic collection of related documents from a variety of sources based on the entire text of a single electronic document.

FIG. 10 depicts the preferred methodology of creating an electronic collection of related documents from a variety of sources based on the entire text of a single electronic document. The methodology may include: utilizing a document such as a webpage to automatically conduct a search of designated sources for documents related to the document based on the entire text contained in the document 140; displaying the related documents found in the search in a collection 141; and storing the collection under a single URL that can be utilized to display the collection 142. A collection of related documents can be automatically curated into the form of an XML (Extensible Markup Language) file that can be linked or associated with the URL. The collection of related documents can be dynamically updated by periodically and, in some cases, automatically re-running searches based on the document/webpage and using the preferred searching methodology to include newly added documents in the designated sources.

The step of utilizing a document such as a webpage to automatically conduct a search of designated sources for documents related to the document based on the entire text contained in the document involves: parsing out the relevant text from any markup in the document and all documents in the designated sources; lowercasing or uppercasing all letters in the text of the document and all documents in the designated sources; correcting misspellings of words in the document and all documents in the designated sources; determining tokens in the document and all documents in the designated sources; removing tokens that are stopwords in the document and all documents in the designated sources; stemming each token in the document and all documents in the designated sources; transforming phrases into individual tokens in the document and all documents in the designated sources; associating each token with particular sections of the document and all documents in the designated sources; obtaining a frequency count of the tokens in the document and all documents in the designated sources; transforming the count of any given token based on the sections it is associated with in the document and all documents in the designated sources; normalizing the counts of the tokens between the document and all documents in the designated sources; transforming the counts of the tokens in ways deemed appropriate for the language or nature of the dataset for the document and all documents in the designated sources; calculating other statistics that apply to each token in the document and all documents in the designated sources; inverting the data such that each token has a set of documents it resides in, along with the associated counts and statistics; and determining a numeric value (value of significance) that measures the magnitude of each token's significance in the source.

The step of utilizing a document such as a webpage to automatically conduct a search of designated sources for documents related to the document based on the entire text contained in the document may further involve: comparing each token's count in the document to its matching token's count in all other documents in the designated sources wherein the magnitude of closeness of the two counts has a directly proportional contribution to the magnitude of the similarity score between the document and any other given document in the designated sources; determining which tokens are present in the document but not present in other documents and vice versa in the designated sources and including an inversely proportional contribution to the magnitude of the similarity score between the document and another document from the designated sources based on the magnitude of each such tokens' count and the total number of each such tokens; utilizing a token's value of significance to include a directly proportional contribution to the magnitude of the similarity score based on the closeness of a token's count between the document and each other document in the designated sources; sorting the set of similarity scores from the designated sources; and displaying the similarity scores from the designated sources in ascending or descending order.

A default setting or user selected setting could be utilized to create a threshold value for a similarity score that must be achieved for a document to be included in the collection or the maximum/minimum number of documents that can be included in the collection.

In some embodiments of the present invention, it may be possible to screen documents in a dataset most efficiently by picking out the token or tokens with the highest similarity scores (e.g. numeric frequency factor times significance magnitude) in the search document (i.e. words that are used often in the search document and that are not used often in the dataset being searched) and only do similarity searches on documents in the dataset that have these highest ranking tokens. For example if the word "interstellar" is used 100 times in a patent (i.e. the search document) and one is searching the US patent database (i.e. dataset) for similar patents and applications it may be desirable to only look at the patents and applications that contain that particular word (i.e. "interstellar") or that particular word combined (not in any particular proximity) with other high ranking words/tokens. This dramatically increases the speed of the search since one would be searching only hundreds or perhaps thousands of patents rather than the 8 million plus patents in the US patent database.

However, screening of documents by only looking at a subset of the documents in a dataset based on some key words/tokens is not necessary in preferred embodiments of the present invention because the flat searching and indexing allows for similarity searches of all the documents in a dataset with a single aggregate similarity score calculated for each document in the dataset vis-à-vis the search criteria document.

In at least one embodiment of the discovery engine disclosed herein, similarity searches may be made across different datasets. This can be a difficult similarity search problem because different datasets contain different styles of language, which can skew the similarity results. As an example, patent databases are full of patents that use arcane legal language, which is not always consistent with how a layman would speak (e.g. the continual use of terms such as "comprising" "methods", "apparatus" and so forth). The use of the value of significance factor will help remedy this problem to a certain extent since these arcane terms in the patent dataset are weighted less heavily than they'd be weighted in other datasets. However a style of writing in a dataset can have an effect on relative similarity scores even after the significance value has been applied.

For example, one could imagine a Wikipedia document that has content that is closely related to a search being done on a patent being used as the search criteria document. However, one could also imagine that the Wikipedia document has a lower gross similarity score than certain patent documents that are not as closely related from a pure content perspective. This could happen because the similar writing styles used by patent attorneys will necessarily result in higher similarity scores for other documents written in the same arcane legal style (i.e. other patents in the patent base). This bias toward documents written in a certain style can have the result of "hiding" or screening out more closely related documents from other datasets written in different styles because of a lower gross similarity score.

Embodiments of the present invention can address this "dataset bias" problem by normalizing the similarity results. FIG. 11 discloses a method 200 configured in accordance with an embodiment of the present inventions for normalizing the similarity results of documents within a dataset. It is disclosed herein that a device configured in accordance with an embodiment of the present invention can be configured to perform the method 200 (e.g., a set of instructions of the device 10 being configured to perform the method 200).

The method 200 begins with an operation 202 being performed for indexing all documents in each one of a plurality of datasets in accordance with an embodiment of the present invention. The documents in a particular dataset are flatly indexed) using only a word count frequency factor for each word in each document (i.e., via the first frequency count) and a significance factor for each word based on the aggregate frequency that each particular word is used in the entire dataset (i.e., via the second frequency count). As discussed previously, the more often a word appears in a dataset the less high is its significance factor. Also as discussed above the frequency factor can be lowered by a logarithmic function. The result of such documents of a dataset is that each word (e.g., token) present in each document in the dataset has a numerical value that is the product of a frequency factor and a significance factor.

An operation 204 is performed for designating search criteria. Designating the search criteria can include a user (e.g., of the device 10) choosing a document or a URL as the search criteria for use in searching for similar documents in each one of the datasets. After designating the search criteria, an operation 206 is performed for conducting a similarity search on each word in the search criteria document in relation to (i.e., vis-à-vis) each word in each document in the dataset to determine word-by-word significance magnitude factor for each document. The significance magnitude factor is a type of similarity score on a per-word (e.g., per-token) basis. Flatly searching is performed in the same manner as disclosed above in reference to the datasets of the operation 202. An operation 208 is then performed for aggregating the word-by-word significance magnitude factors to generate an aggregate similarity score. Aggregating the word-by-word similarity scores to generate the aggregate similarity score includes aggregating (e.g., combining) the word-by-word similarity score for every word in each of the documents of a dataset thereby determining a single similarity score for each document in a dataset vis-à-vis the search criteria document.

In order to normalize the similarity scores between different datasets, it is necessary to go beyond the single (i.e., gross) similarity score of each document. What is needed is a normalized comparison of similarities within each dataset. To this end, an operation 210 is performed for determining an arithmetic mean of the similarity scores for all of the documents in each one of the datasets. Determining an arithmetic mean of the similarity scores for all of the documents in the dataset can include calculating the mean (e.g., average) similarity score vis-à-vis the search criteria for the entire dataset. For example, the mean similarity score can be calculated by adding up all the similarity scores for all the documents in the dataset and then dividing this total number by the number of documents in the dataset. It is also possible to use other statistical averages represented by bell curves. After the mean similarity score (or some other statistically average number) for each dataset is known, an operation 212 is performed for generating a dataset normalized similarity score for each document of the dataset dependent upon the arithmetic mean of the similarity scores for all of the documents in the dataset. Generating a dataset normalized similarity score for each document of the dataset can include determining a variance factor (e.g., the variance or deviation (e.g. standard deviation)) for each document relative to the arithmetic mean of the similarity scores for all of the documents in the dataset and then multiply the variance factor for a particular document times the gross similarity score of the particular document, thereby generating a normalized similarity score that has a contextual relationship to the dataset. This normalized similarity score allows for comparison of documents between datasets with varying styles of writing and organization.

For example, a patent document when compared to a search criteria document might have a similarity score of X, which is twice as high as the gross similarity score for a particular Wikipedia article at 0.5X. However, it may be that the other patents in the dataset might also have a similarity score not considerably different from X so that the deviation from the mean is pretty low (e.g. 1.2 times). On the other hand, if the mean Wikipedia similarity score is very low, the deviation from the mean might be a factor of 3. In this case the normalized Wikipedia document score (3 times 0.5X=1.5X) is higher than the normalized patent document score of (1.2 times X+1.2×) and the Wikipedia article would rank higher in normalized similarity then the patent document.

This deviation from average or mean similarity scores in a dataset is an efficient and effective way or normalizing results between datasets. Accordingly, an operation 214 is performed for determining relevance of documents of different datasets dependent upon the normalized similarity score of each document as opposed to the non-normalized similarity score of each document.

A person of skill in the art would readily recognize that steps of the various above-described methods can be performed by programmed computers and the order of the steps is not necessarily critical. Herein, some embodiments of the present invention are intended to cover program storage devices, e.g., digital data storage media, which are machine or computer readable and encode machine-executable or computer executable programs of instructions where said instructions perform some or all of the steps of methods described herein. The program storage devices may be, e.g., digital memories, magnetic storage media such as magnetic disks or tapes, hard drives, or optically readable digital data storage media. Some embodiments of the present invention are also intended to cover computers programmed to perform said steps of methods described herein.

In view of the disclosures made herein, a skilled person will appreciate that a discovery engine configured in accordance with an embodiment of the present invention can be implemented in a manner that enables functionality as depicted in the following example.

Example—Discover Engine Functionality

Using a discovery engine configured in accordance with the disclosure made herein (i.e., an inventive search engine) or prior art search method, a researcher has found a patent of interest entitled "Interstellar Light Collector" (i.e., U.S. Pat. No. 7,338,148, which his hereinafter referred to as the '148 patent). The researcher is interested in finding other US patents similar to the '148 patent. Using the entire text of the '148 patent as the search criteria within the inventive search engine, the researcher designates (e.g., chooses through selection from a plurality of selection options) the US patent database as the dataset to be searched using the '148 patent text as the search criteria.

The inventive search engine performs flat searching of documents within the dataset (i.e., the US patent database) with respect to the search criteria (i.e., the entire text of the '148 patent). The search criteria are processed for identifying tokens therein. As illustrated below for an exemplary token (e.g., word) "interstellar", each token of the '148 patent is processed in accordance with the present invention for enabling calculation of a similarity score.

In the '148 patent, the token "interstellar" is found 8 times (i.e., the first frequency count for the token "interstellar"). Rather than using the raw number 8 as a token frequency multiplier, the raw number can be lowered by using a logarithmic function the raw number. In this example, the square root of 8 is utilized (i.e., frequency multiplier=$\sqrt{8}$). To find a significance magnitude factor for each individual token (e.g., word) for "interstellar" used in calculation of the similarity score, it is necessary to multiply its frequency multiplier by its significance factor. In this example (i.e., (not an actual count of the number of times "instellar" is used in the US patent dataset), the token "interstellar" is theoretically found 8,000 times in the entire US patent database of 8 million patents (i.e., the aggregate token count of the dataset), which is the second frequency count for the token "interstellar"). The aggregate token count is then divided by the number of documents in the dataset (i.e., the 8 million patents of the US patent database) to find that the frequency of use in the dataset is 8,000/8,000,000 or 1/1000. Significance is the inverse of frequency of use in the dataset, such that the significance factor of the word "interstellar" in this example is 1000. Accordingly, the significance factor for the word "interstellar" in the '148 patent (i.e. search criteria document) is $\sqrt{8} \times 1000$ or nominally 2,282.

Calculation of frequency multiplier and significance factor is repeated for every token in the '148 patent and for every document in the dataset to determine significance magnitude factors for all tokens of all document in the dataset with respect to the search criteria and are thereafter used for calculating the overall similarity score between the '148 patent and each document in the dataset (e.g., by summing all of the significance magnitude factors above a certain threshold, by selecting only significance magnitude factors within a designated deviation from a greatest the significance magnitude factor, etc). In this regard, in view of the disclosures made herein, a skilled person will appreciate that the similarity score is a function of a first frequency count (i.e., that characterizes a number of times that each token of the search criteria occurs within the search criteria (i.e., text thereof) and each one of the documents in the source) and a second frequency count (i.e., that characterizing an aggregate number of times that a particular one of the tokens occurs within all of the documents in the dataset).

Figure 12:
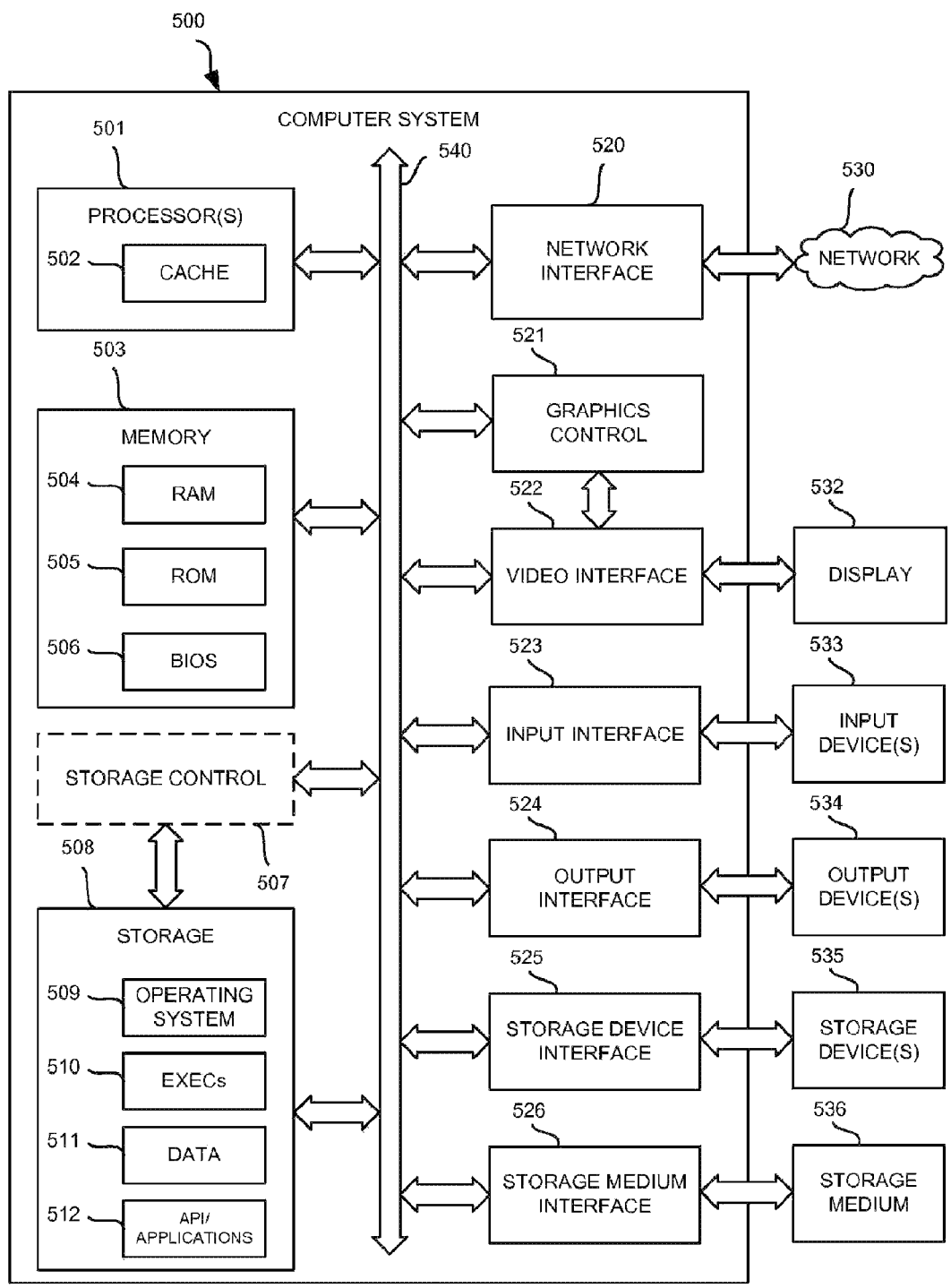
FIG. 12 is a diagrammatic representation showing an embodiment of a computer system configured in accordance with an embodiment of the present invention.

Turning now to a discussion of approaches for implementing embodiments of the present invention, systems and methods in accordance with embodiments of the present invention can be implemented in any number of different types of data processing systems (e.g., a computer system) in addition to the specific physical implementation of a data processing system in the form of a smart phone, tablet or similar configuration of mobile communication device. To this end, FIG. 12 shows a diagrammatic representation of one embodiment of a computer system 500 within which a set of instructions can execute for causing a device to perform or execute any one or more of the aspects and/or methodologies of the present disclosure. The components in FIG. 12 are examples only and do not limit the scope of use or functionality of any hardware, software, embedded logic component, or a combination of two or more such components implementing particular embodiments.

The computer system 500 can include a processor 501, memory 503, and storage 508 that communicate with each other, and with other components, via a bus 540. The bus 540 can also link a display 532, one or more input devices 533 (which can, for example, include a keypad, a keyboard, a mouse, a stylus, etc.), one or more output devices 534, one or more storage devices 535, and various tangible (e.g., non-transitory) storage media 536. All of these elements can interface directly or via one or more interfaces or adaptors to the bus 540. For instance, the various tangible storage media 536 can interface with the bus 540 via storage medium interface 526. Computer system 500 can have any suitable physical form, including but not limited to one or more integrated circuits (ICs), printed circuit boards (PCBs), mobile communication devices (such as smart phones, tablets, personal digital assistants (PDAs)), laptop or notebook computers, distributed computer systems, computing grids, or servers. All or a portion of the elements 501-536 can be housed in a single unit (e.g., a cell phone housing, a tablet housing, or the like).

Processor(s) 501 (or central processing unit(s) (CPU(s))) optionally contains a cache memory unit 502 for temporary local storage of instructions, data, or computer addresses. Processor(s) 501 are configured to assist in execution of computer readable instructions. Computer system 500 can provide functionality as a result of the processor(s) 501 executing software embodied in one or more tangible (e.g., non-transitory) computer-readable storage media, such as memory 503, storage 508, storage devices 535, and/or storage medium 536. The computer-readable media can store software that implements particular embodiments, and processor(s) 501 can execute the software. Memory 503 can read the software from one or more other computer-readable media (such as mass storage device(s) 535, 536) or from one or more other sources through a suitable interface, such as network interface 520. The software can cause processor(s) 501 to carry out one or more processes or one or more steps of one or more processes described or illustrated herein. Carrying out such processes or steps (i.e., operations) can include defining data structures stored in memory 503 and modifying the data structures as directed by the software.

The memory 503 can include various components (e.g., machine readable media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 can act to communicate data and instructions unidirectionally to processor(s) 501, and RAM 504 can act to communicate data and instructions bidirectionally with processor(s) 501. ROM 505 and RAM 504 can include any suitable tangible computer-readable media described below. In one example, a basic input/output system 506 (BIOS), including basic routines that help to transfer information between elements within computer system 500, such as during start-up, can be stored in the memory 503.

Fixed storage 508 is connected bidirectionally to processor(s) 501, optionally through storage control unit 507. Fixed storage 508 provides additional data storage capacity and can also include any suitable tangible computer-readable media described herein. Storage 508 can be used to store operating system 509, EXECs 510 (executables), data 511, APV applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 can, in appropriate cases, be incorporated as virtual memory in memory 503.

In one example, storage device(s) 535 can be removably interfaced with computer system 500 (e.g., via an external port connector (not shown)) via a storage device interface 525. Particularly, storage device(s) 535 and an associated machine-readable medium can provide nonvolatile and/or volatile storage of machine-readable instructions, data structures, program modules, and/or other data for the computer system 500. In one example, software can reside, completely or partially, within a machine-readable medium on storage device(s) 535. In another example, software can reside, completely or partially, within processor(s) 501.

Bus 540 connects a wide variety of subsystems. Herein, reference to a bus can encompass one or more digital signal lines serving a common function, where appropriate. Bus 540 can be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 can also include an input device 533. In one example, a user of computer system 500 can enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 can be interfaced to bus 540 via any of a variety of input interfaces 523 (e.g., input interface 523) including, but not limited to, serial, parallel, game port, USB (universal serial bus), FIREWIRE, THUNDERBOLT, or any combination of the above.

In particular embodiments, when computer system 500 is connected to network 530, computer system 500 can communicate with other devices, specifically mobile devices and enterprise systems, connected to network 530. Communications to and from computer system 500 can be sent through network interface 520. For example, network interface 520 can receive incoming communications (such as requests or responses from other devices) in the form of one or more packets (such as Internet Protocol (IP) packets) from network 530, and computer system 500 can store the incoming communications in memory 503 for processing. Computer system 500 can similarly store outgoing communications (such as requests or responses to other devices) in the form of one or more packets in memory 503 and communicated to network 530 from network interface 520. Processor(s) 501 can access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, can employ a wired and/or a wireless mode of communication. In general, any network topology can be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 can include one or more other peripheral output devices 534 including, but not limited to, an audio speaker, a printer, and any combinations thereof. Such peripheral output devices can be connected to the bus 540 via an output interface 524. Examples of an output interface 524 include, but are not limited to, a serial port, a parallel connection, a USB port, a FIREWIRE brand port, a THUNDERBOLT brand port, a LIGHTNING brand port, and any combinations and/or connectors thereof.

In addition or as an alternative, computer system 500 can provide functionality as a result of logic hardwired or otherwise embodied in a circuit, which can operate in place of or together with software to execute one or more processes or one or more steps of one or more processes described or illustrated herein. Reference to software in this disclosure can encompass logic, and reference to logic can encompass software. Moreover, reference to a computer-readable medium (also sometimes referred to as machine-readable medium" can encompass a circuit (such as an IC) storing software for execution, a circuit embodying logic for execution, or both, where appropriate. The present disclosure encompasses any suitable combination of hardware, software, or both.

The term "computer-readable medium" should be understood to include any structure that participates in providing data that can be read by an element of a computer system. Such a medium can take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

Those of skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

The previous description of the disclosed embodiments is provided to enable any person skilled in the art to make or use the present invention. Various modifications to these embodiments will be readily apparent to those skilled in the art, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

It will be recognized by those skilled in the art that changes or modifications may be made to the above-described embodiments of the present invention without departing from the broad inventive concepts of the invention. It should therefore be understood that this invention is not limited to the particular embodiments of the present invention described herein, but is of the invention as set forth in the claims.

What is claimed is:

1. A system for semantically searching a group of documents containing words, exclusive of stop words of the documents, thereby improving efficiency by flatly looking at the words being searched without attempting to understand the meaning of the words, comprising:
    a memory containing a set of instructions; and
    a processor for processing the set of instructions, wherein the instructions cause the processor to perform a method comprising:
    receiving by the processor a current instance of a search criteria containing words;
    determining by the processor a first total number of the words, exclusive of stop words, in the current instance of the search criteria;
    storing in the memory by the processor the first total number;

for each of the words, exclusive of stop words, respectively, in the current instance of the search criteria, determining by the processor a respective first number of times that the word appears in the current instance of the search criteria;

storing in the memory by the processor the respective first number of times;

for each of the words, exclusive of stop words, respectively, in the current instance of the search criteria, calculating by the processor a first uniqueness score, respectively, for the word, respectively, based on the respective first number and the first total number;

storing in the memory by the processor the first uniqueness score, respectively, for the word, respectively;

for each of the words, exclusive of stop words, respectively, of the current instance of the search criteria and the documents, determining by the processor a respective second number of times that the word appears in the current instance of the search criteria and the documents;

storing in the memory by the processor the respective second number of times, as a first frequency score, respectively;

for each of the words, exclusive of stop words, of the current instance of the search criteria and the each of the documents, respectively, calculating by the processor a respective first significance magnitude factor based on the first frequency score, respectively, and the first uniqueness score, respectively;

storing in the memory by the processor the respective first significance magnitude factor;

determining by the processor a second total number of the words, exclusive of stop words, in the documents of the group;

storing in the memory by the processor the second total number;

for each of the words, exclusive of stop words, respectively, of the documents, respectively, determining by the processor a respective third number of times that the word appears in the documents of the group;

storing in the memory by the processor the respective third number of times;

for each of the words, exclusive of stop words, respectively, of the documents, calculating by the processor a second uniqueness score, respectively, for the word, respectively, based on the respective third number and the second total number;

storing in the memory by the processor the second uniqueness score, respectively, for the word, respectively;

for each of the words, exclusive of stop words of the documents, respectively, in each of the documents, respectively, determining by the processor a respective fourth number of times that the word appears in the document;

storing in the memory by the processor the respective fourth number, as a second frequency score, respectively;

for each of the words, exclusive of stop words, of the documents, calculating by the processor a respective second significance magnitude factor based on the second frequency score, respectively, and the second uniqueness score, respectively;

storing in the memory by the processor the respective second significance magnitude factor; and for each document of the group, generating by the processor a respective similarity score of contents of the document to the current instance of the search criteria, wherein generating the respective similarity score includes characterizing each document based on the respective second significance magnitude factor compared to the respective first significance magnitude factor.

2. The system of claim 1 wherein:

the current instance of the search criteria includes a uniform resource locator (URL); and receiving the current instance of search criteria includes accessing information residing at a location designated by the URL, extracting at least a portion of the information that is in a format native to the location designated by the URL and generating search criteria in a text-based format from at least a portion of the identified information in the format native to the location designated by the URL.

3. The system of claim 2 wherein the method further comprises:

sorting the respective similarity scores for at least a portion of the documents of the group for creating a set of the respective similarity scores associated with the current instance of the search criteria;

enabling a document corresponding to one of the respective similarity scores of the set to be designated as a next instance of the search criteria; and causing the method to be performed for the next instance of the search criteria as the current instance of the search criteria.

4. The system of claim 1 wherein the method further comprises:

sorting the respective similarity scores for at least a portion of the documents of the group for creating a set of the respective similarity scores associated with the current instance of the search criteria;

enabling a document corresponding to one of the respective similarity scores of the set to be designated as a next instance of the search criteria; and causing the method to be performed for the next instance of the search criteria as the current instance of the search criteria.

5. The system of claim 1 wherein generating the respective similarity score includes normalizing at least a portion of the respective second significance magnitude factor as a function of page count of the respective one of the documents with respect to one or more other documents in the documents of the group.

6. The system of claim 5 wherein:

the current instance of the search criteria includes a uniform resource locator (URL); and receiving the current instance of search criteria includes accessing information residing at a location designated by the URL, extracting at least a portion of the information that is in a format native to the location designated by the URL and generating search criteria in a text-based format from at least a portion of the identified information in the format native to the location designated by the URL.

7. The system of claim 6 wherein the method further comprises:

sorting the respective similarity scores for at least a portion of the documents of the group for creating a set of the respective similarity scores associated with the current instance of the search criteria;

enabling a document corresponding to one of the respective similarity scores of the set to be designated as a next instance of the search criteria; and causing the method to be performed for the next instance of the search criteria as the current instance of the search criteria.

8. The system of claim 1 wherein the method further comprises:
generating respective similarity scores for documents from a first group and for documents from a second group; and
normalizing the respective similarity scores of each one of the documents from the first group and each one of the documents from the second group with respect to all documents of the first and second groups.

9. The system of claim 8 wherein normalizing the respective similarity scores includes:
for each one of the groups, determining an arithmetic mean of the respective similarity scores for all of the documents in the one of the groups;
for each one of the groups, generating a respective group normalized similarity score for each document of the one of the groups dependent upon the arithmetic mean of the respective similarity scores for all of the documents of the one of the groups; and
for each one of the documents of each one of the groups, determining relevance of each one of the documents dependent upon the respective group normalized similarity score of each one of the documents of each one of the groups.

10. The system of claim 8 wherein:
the current instance of the search criteria includes a uniform resource locator (URL); and
receiving the current instance of search criteria includes accessing information residing at a location designated by the URL, extracting at least a portion of the information that is in a format native to the location designated by the URL and generating search criteria in a text-based format from at least a portion of the identified information in the format native to the location designated by the URL.

11. The system of claim 8 wherein the method further comprises:
sorting the similarity scores for at least a portion of the documents of at least one of the groups for creating a set of respective similarity scores associated with the current instance of the search criteria;
enabling a document corresponding to one of the similarity scores of the at least one of the groups to be designated as a next instance of the search criteria; and
causing the method to be performed for the next instance of the search criteria as the current instance of the search criteria.

12. The system of claim 8 wherein generating the respective similarity score includes normalizing at least a portion of the respective second significance magnitude factor as a function of page count of the respective one of the documents with respect to one or more other documents in the first and second groups.

13. A non-transitory computer-readable medium having tangibly embodied thereon and accessible therefrom processor-executable instructions that, when executed by at least one data processing device of at least one computer, causes said at least one data processing device to perform a method comprising:
receiving a current instance of search criteria of words;
determining a first total number of words in the current instance of the search criteria;

for each of the words in the current instance of the search criteria, determining a respective first number of times that the word appears in the current instance of the search criteria;
for each of the words in the current instance of the search criteria, calculating a first uniqueness score, respectively, for the word in the search criteria based on the respective first number and the first total number;
for each of the words of the search criteria and each document of at least one dataset, determining a respective second number of times that the word appears in the search criteria and the document;
for each of the words of the current instance of the search criteria and the documents, calculating a respective first significance magnitude factor based on the respective second number and the first uniqueness score, respectively;
determining a second total number of words in the documents;
for each of the words, respectively, of each of the documents, respectively, determining a respective third number of times that the word appears in the document;
for each of the words, respectively, of the documents, calculating a second uniqueness score, respectively, for the word in the documents;
for each of the words of each document, determining a fourth number of times that the word appears in the document
for each of the words of the documents, calculating a respective second significance magnitude factor based on the respective fourth number and the second uniqueness score, respectively;
for each document of the at least one dataset, generating a respective similarity score of contents of the document to the current instance of the search criteria, wherein generating the respective similarity score includes characterizing each document based on the respective second significance magnitude factor compared to the respective first significance magnitude factor;
thereby improving efficiency of data processing by flatly looking at the words being searched without attempting to understand the meaning of the words.

14. The non-transitory computer-readable medium of claim 13 wherein:
the current instance of the search criteria includes a uniform resource locator (URL); and
receiving the current instance of search criteria includes accessing information residing at a location designated by the URL, extracting at least a portion of the information that is in a hypertext markup language (HTML) format and generating search criteria in an extensible markup language (XML) format from at least a portion of the identified information in the HTML format.

15. The non-transitory computer-readable medium of claim 13 wherein the method further comprises:
sorting the respective similarity scores for at least a portion of the documents of the at least one dataset for creating a set of the respective similarity scores associated with the current instance of the search criteria;
enabling a document corresponding to one of the respective similarity scores of the set to be designated as a next instance of the search criteria; and
causing the method to be performed for the next instance of the search criteria as the current instance of the search criteria.

16. The non-transitory computer-readable medium of claim 13 wherein generating the respective similarity score includes normalizing at least a portion of the respective second significance magnitude factor as a function of page count of the respective one of the documents with respect to one or more other documents in the documents of the at least one dataset.

17. The non-transitory computer-readable medium of claim 16 wherein:
the current instance of the search criteria includes a uniform resource locator (URL); and
receiving the current instance of search criteria includes accessing information residing at a location designated by the URL, extracting at least a portion of the information that is in a format native to the location designated by the URL and generating search criteria in a text-based format from at least a portion of the identified information in the format native to the location designated by the URL.

18. The non-transitory computer-readable medium of claim 13 wherein the method further comprises:
generating the respective similarity scores for documents from a first dataset and for documents from a second dataset; and
normalizing the respective similarity scores of each one of the documents from the first dataset and each one of the documents from the second dataset with respect to all documents of the first and second datasets.

19. The non-transitory computer-readable medium of claim 18 wherein normalizing the respective similarity scores includes:
for each one of the datasets, determining an arithmetic mean of the respective similarity scores for all of the documents in the one of the datasets;
for each one of the datasets, generating a respective dataset normalized similarity score for each document of the one of the datasets dependent upon the arithmetic mean of the respective similarity scores for all of the documents of the one of the datasets; and
for each one of the documents of each one of the datasets, determining relevance of each one of the documents dependent upon the respective dataset normalized similarity score of each one of the documents of each one of the datasets.

20. A non-transitory computer-readable medium having tangibly embodied thereon and accessible therefrom processor-executable instructions that, when executed by at least one data processing device of at least one computer, causes said at least one data processing device to perform a method comprising:
receiving a current instance of search criteria, wherein the current instance of the search criteria includes a uniform resource locator (URL);
determining a first total number of words in the current instance of the search criteria;
for each of the words in the current instance of the search criteria, determining a respective first number of times that the word appears in the current instance of the search criteria;
for each of the words in the current instance of the search criteria, calculating a first uniqueness score, respectively, for the word in the search criteria based on the respective first number and the first total number;
for each of the words of the search criteria and each document of at least one source of documents, performing a respective second number of times that the word each token appears in the search criteria and the document of the at least one source of documents;
for each of the words of the current instance of the search criteria and the documents, calculating a respective first significance magnitude factor based on the respective second number and the first uniqueness score, respective;
determining a second total number of words in the documents;
for each of the words, respectively, of each of the documents, respective, determining a respective third number of times that the word appears in the document;
for each of the words, respectively, of the documents, calculating a second uniqueness score, respectively, for the word in the documents;
for each of the words of each document, determining a fourth number of times that the word appears in the document;
for each of the words of the documents, calculating a respective second significance magnitude factor based on the respective fourth number and the second uniqueness score, respectively; and
for each document in the at least one source of documents, generating a respective similarity score between the text used as the current instance of the search criteria and the document, wherein the similarity score is a function of the respective second significance magnitude factor and the respective first significance magnitude factor for the document;
thereby improving efficiency of data processing by flatly looking at the words being searched without attempting to understand the meaning of the words.

21. The non-transitory computer-readable medium of claim 20 wherein receiving the current instance of search criteria includes:
accessing information residing at a location designated by the URL;
extracting at least a portion of the information that is in a format native to the location designated by the URL; and
generating search criteria in a text-based format from at least a portion of the identified information in the format native to the location designated by the URL.

22. The non-transitory computer-readable medium of claim 20 wherein the method further comprises:
sorting the respective similarity scores for at least a portion of the documents of the at least one source of documents for creating a set of the respective similarity scores associated with the current instance of the search criteria;
enabling a document corresponding to one of the respective similarity scores of the set to be designated as a next instance of the search criteria; and
causing the method to be performed for the next instance of the search criteria as the current instance of the search criteria.

23. The non-transitory computer-readable medium of claim 20 wherein generating the respective similarity score includes normalizing at least a portion of the respective second significance magnitude factor as a function of page count of the respective one of the documents with respect to one or more other documents in the at least one source of documents.

24. The non-transitory computer-readable medium of claim 23 wherein receiving the current instance of search criteria includes:

accessing information residing at a location designated by the URL;

extracting at least a portion of the information that is in a format native to the location designated by the URL; and generating search criteria in a text-based format from at least a portion of the identified information in the format native to the location designated by the URL.

25. The non-transitory computer-readable medium of claim 20 wherein the method further comprises:

generating the respective similarity scores for documents from a first source of documents and for documents from a second source of documents; and normalizing the respective similarity scores of each one of the documents from the first source of documents and each one of the documents from the second source of documents with respect to all documents of the first and second source of documents.

26. The non-transitory computer-readable medium of claim 25 wherein normalizing the respective similarity scores includes:

for each one of the sources of documents, determining an arithmetic mean of the respective similarity scores for all of the documents in the one of the source of documents;

for each one of the sources of documents, generating a respective dataset normalized similarity score for each document of the one of the source of documents dependent upon the arithmetic mean of the respective similarity scores for all of the documents of the one of the source of documents; and for each one of the documents of each one of the sources of documents, determining relevance of each one of the documents dependent upon the respective dataset normalized similarity score of each one of the documents of each one of the source of documents.

27. A method of semantically searching a group of documents containing words, the words are exclusive of stop words of the documents, by a computer including at least a processor and memory, thereby improving the efficiency of computer resources by flatly looking at the words being searched without attempting to understand the meaning of the words, comprising:

(A) indexing by the processor each document of the group by (a) counting a first count of a total number of the words contained in the documents of the group, (b) storing in the memory the first count, (c) for each of the words, respectively, of the documents of the group, respectively, counting a second count, respectively, of a number of times that the word appears in the documents of the group, (d) for each of the words, respectively, of the documents of the group, storing in the memory the second count, respectively, (e) for each of the words, respectively, of the documents of the group, calculating a uniqueness score, respectively, based on the second count, respectively, for the word, and the first count, and (f) for each of the words, respectively, of the documents of the group, storing in the memory the uniqueness score for the word;

(B) indexing by the processor each document of the group by (a) for each of the words and for each of the documents, counting a third count, respectively, of a number of times the word appears in the document, (b) for each of the words for each of the documents, respectively, storing in the memory the third count, respectively, as a frequency score, respectively, (c) for each of the words and for each of the documents, calculating a first significance magnitude factor, respectively, based on the frequency score, respectively, and the uniqueness score, respectively, and (d) for each of the words for each of the documents, respectively, storing in the memory the first significance magnitude factor, respectively;

(C) receiving by the processor a search criteria, the search criteria selected from the group consisting of: any of the documents, any search words, any other document not in the group, any URL, and combinations;

(D) indexing by the processor the search criteria and the documents of the group using the same steps set forth in (A) and (B) above using only words, exclusive of stop words, of the search criteria, to obtain a second significance magnitude factor, respectively, for each of the words, respectively, of the search criteria;

(E) comparing the second significance factor for each of the words in the search criteria to the first significance factor for the words, respectively, in each of the documents of the group;

(F) for each of the documents of the group, aggregating results of the comparing, for each of the words of the search criteria, into a similarity score, respectively, for the document in comparison to the search criteria;

(G) presenting the similarity scores, respectively, for the documents, respectively, so that the documents in the group having significance in respect of the similarity scores can be utilized by a person looking for documents in the group that are similar to the search criteria.

\* \* \* \* \*